United States Patent [19]

Swanson

[11] Patent Number: 4,821,164

[45] Date of Patent: Apr. 11, 1989

[54] PROCESS FOR THREE-DIMENSIONAL MATHEMATICAL MODELING OF UNDERGROUND GEOLOGIC VOLUMES

[75] Inventor: Donald C. Swanson, Houston, Tex.

[73] Assignee: Stratamodel, Inc., Houston, Tex.

[21] Appl. No.: 890,467

[22] Filed: Jul. 25, 1986

[51] Int. Cl.⁴ .............................................. G01V 1/00
[52] U.S. Cl. ..................................... 364/420; 367/69
[58] Field of Search ....................... 364/420, 421, 422; 367/69, 72, 73

[56] References Cited

U.S. PATENT DOCUMENTS

| | | |
|---|---|---|
| 3,434,568 | 3/1969 | Caldwell . |
| 3,484,740 | 12/1969 | Cook . |
| 3,512,131 | 5/1970 | Nelson et al. . |
| 3,539,981 | 11/1970 | Sattlegger . |
| 3,638,178 | 1/1972 | Stephenson . |
| 3,668,619 | 6/1972 | Dennis . |
| 3,931,609 | 1/1976 | Anstey . |
| 3,946,356 | 3/1976 | Anstey . |
| 4,030,064 | 6/1977 | Elliott . |
| 4,032,912 | 6/1977 | Wood . |
| 4,063,216 | 12/1977 | Chapman et al. . |
| 4,078,177 | 3/1978 | Tiemens . |
| 4,210,964 | 7/1980 | Rogers et al. . |
| 4,241,429 | 12/1980 | Bloomquist et al. . |
| 4,314,338 | 2/1982 | Suau et al. ............................ 364/422 |
| 4,314,339 | 2/1982 | Kenyon ............................... 364/422 |
| 4,558,438 | 12/1985 | Jones et al. . |
| 4,633,402 | 12/1986 | Flinchbaugh ........................ 364/421 |
| 4,633,448 | 12/1986 | Koeijmans ........................... 364/421 |

FOREIGN PATENT DOCUMENTS 2164751  3/1986  United Kingdom ................. 367/72

OTHER PUBLICATIONS

B. A. Blake "3D Seismic Data Reveals the finer Structural Details of a Piercement Salt Dome" ©1982.
Address by Thomas A. Jones, "Three Dimensional Computer Modeling for Exploration and Reservoir Analysis" Annual Convention, The American Association of Petroleum Geologists (Mar. 24-27, 1985).
Salin, Yu. S., "Basic Geometrical Models in Geology: Werner's Topological Model," Mathematical Geology, vol. 17, No. 5, p. 547 (1985).
Declaration by James B. Coffman (Oct. 23, 1986).

*Primary Examiner*—Jerry Smith
*Assistant Examiner*—Steven Kibby
*Attorney, Agent, or Firm*—Arnold, White & Durkee

[57] ABSTRACT

A process for modeling a bounded volume having a given geologic stratigraphic pattern, other than a volume having layers of uniform thickness parallel to mean sea level. The process comprises the steps of constructing a separate grid for each critical surface bounding said volume and constructing layers of cells according to the stratigraphic pattern.

16 Claims, 20 Drawing Sheets

MODULE C (PROPORTIONAL, THICKNESS/THINNING)

PROCESS FOR THREE-DIMENSIONAL MATHEMATICAL MODELING OF UNDERGROUND GEOLOGIC VOLUMES

BACKGROUND OF THE INVENTION

1. Field of the Invention

The present invention pertains to the modeling of geologic volumes of the earth's crust. It further pertains to a system for developing a model of a geologic volume by locating positions of observations within the model which correspond to known positions of observations in the geologic volume, and thereafter extrapolating from or interpolating between such positions of observations. The model is composed of a plurality of small incremental volumetric elements configured to resemble corresponding incremental volumetric elements in the geologic volume. The invention has particular application to the study and modeling of any volume of the earth's crust comprising layered (stratigraphic, bedded) rock, strata, or deposits.

2. Description of the Related Art

The modeling of geologic volumes is widely practiced. Modeling is important in many different industries and fields of technology. It is important, for example, in assessing ground water resources and in plotting the migration of toxic chemicals. Expert witnesses in lawsuits may choose to base their testimony on modeling. Attorneys may choose to use certain models as demonstrative evidence before a judge or jury. Various federal agencies require modeling of certain parts of the earth's crust. It is also important in the mining and petroleum industries to locate minerals. The purpose of such modeling is to organize known information on geologic volumes and to predict the nature and distribution of descriptive attributes and/or quantitative values within the volume, thereby facilitating studies and actions relative to the volumes.

Modeling may be performed in several ways, as for example, by making maps or sections of volumes directly from the information. Generally speaking, a map is a two-dimensional projection on a horizontal planar surface of a representation of features of the volume modeled. A section, on the other hand, is normally a graphic representation of the volume projected on a vertical plane cutting the volume. The present invention has application for producing both maps and sections. Another way to model is to systematically store the information in computers, and thereafter recover the information as desired. Recovery of the stored information in some instances may involve feeding the information to plotters which automatically plot the data in map or section form. In general, then, the art of modeling a geologic volume in a first aspect resides in building a model of the volume by assembling known data as well as extrapolated and interpolated data throughout the modeled volume. Once the model is built, displays such as maps, cross-sections, and statistical information result from the model.

Modeling the earth's crust, including map and section making, involves complex geological and geophysical relationships and many types of data and observations. Of particular interest are geological volumes of sedimentary rocks or deposits, since almost all oil and gas, many mineral deposits, and most ground water normally occur in sedimentary deposits—typically in porous reservoirs such as clastic (sandstones), secreted, and/or precipitated deposits. Such deposits generally exist in layers (strata, beds), formed over periods of geological time by various physical, chemical, and biological processes. The deposits may have been formed by rivers dropping sediments at their deltas, by wind-blown sediment, by wave and marine action, by tidal action, by precipitation from a solution, by secretions by living organisms, or by other mechanisms. The deposits may have been modified by weathering, erosion, burial, and structural movement.

A present day layer or formation of sedimentary rocks or deposits was originally laid down on a depositional surface (time line) that was either essentially horizontal or at an angle or slope (depositional slope) with respect to a horizontal plane (sea level). The deposited layer may have experienced vast changes in position and configuration with time. Forces of burial, compaction, distortion, lateral and vertical movement, weathering, etc. may have resulted in the formation being fractured, faulted, folded, sheared, or modified substantially. As a result, any given geologic volume will normally be found to be a complex relationship of rock layers which may extend thousands of feet below the surface of the earth to the earth's mantle. A particular geologic volume may involve numerous superimposed layers of sediments, which were originally deposited on a horizontal or sloping depositional surface and may be subsequently tilted, fractured, folded, pierced, overturned, faulted, weathered, eroded, or otherwise modified in many ways.

Of special interest to geologists and groundwater experts interested in oil, gas, minerals, and water are geologic deposits or strata having porosity and permeability which enable them to transport or hold fluids or other materials of economic importance. Geological features such as anticlines, faults, stratigraphic traps and salt domes are of particular importance because of their ability to trap and store such fluids.

A common problem for earth scientists is to reconstruct, interpret, or determine what the "state of nature" of any given geologic volume comprises from: (1) examination of the surface of the earth, (2) examinations of fluids, cores, or well cuttings from penetrations of the earth, or (3) observation of physical, chemical, or biologic response from either penetrations or surface observation. Their attack on the problem has given rise to many specialized fields of geology, geophysics, geochemistry, well logging, etc. Their work has resulted in the development of many types of techniques and apparatus. Application of the techniques and apparatus, in turn has resulted in numerous types of data. Some of the data are related to determining the relative amounts of water, minerals, oil and gas, etc. in a given formation; some are related to describing and identifying characteristics of rocks (lithology) or identifying fossils on the surface or in different wells; and some are related to determining properties such as permeability, porosity, or structural attitude by observing the earth's electric, seismic, or radiologic response.

Geologic data may be obtained by studying outcrops at the surface of the earth. Geophysical surveys, including magnetic, gravity and seismic surveys, also supply data. Drilling oil wells also supplies data. Thus, in the oil industry drill cuttings and drilling fluids are typically analyzed for hydrocarbon content. Other study items in the search for oil include fossils, pollen, pore volumes, nature or facies of rocks, environments of deposition, sand and shale ratios, etc. Various types of logging tools are also run into wells to record well logs of all types, including, e.g., electric logs, radiation logs, and magnetic logs.

Substantial efforts are made in studying any given geologic volume to obtain as much data as possible about the volume. Even though several wells may be drilled, and numerous geophysical surveys made, it will nevertheless be a common practice to interpolate and extrapolate critical data throughout the volume. This is particularly the case for data obtained from laterally spaced wells in the same geologic volume. However, interpretation by manual interpolation and extrapolation of data is tedious, time consuming, and may be subject to errors of logic. It is also difficult, because geologic layers, strata, or beds almost never lie above one another in neat, consistent, horizontal, and laterally extensive sequences. The formations vary in their lateral extent and spatial position and attitude and the interpolation and extrapolation must take this into account.

The advent of digital computers and automatic plotters has been a great aid to the tasks of storing, recovering, and mapping data in simple presentations. And in recent years, efforts have been made to generate or build actual models of geologic volumes. Much, however, remains to be done.

Three-dimensional geologic modeling techniques currently in use rely generally on the use of relatively thin, horizontally disposed layers extending throughout a geologic volume. The bounding surfaces between the layers are smooth and horizontal. Each layer is divided longitudinally and laterally by a grid of lines, so that each layer consists of a plurality of cells which are right-angled hexahedrons or parallelepipeds of uniform size resembling tiles. Each edge of these grid cells or elements is selected to represent a particular distance in the geologic volume being modeled. Generally, the horizontal edges represent much greater distances than do the vertical or corner edges or risers. For example, the horizontal edges or dimensions of each cell may typically represent from tens of feet to miles of an actual volume; and each riser may typically represent from several inches up to several hundred feet or more.

A person using prior art models will assign each cell in the model an address, comprising, e.g., the x, y, and z coordinates of that cell. These coordinates may then be used as an address in storing, processing and recalling the data for that particular cell.

Geologic modeling techniques currently practiced generally make use of all available data on a geologic volume to be modeled. First, the exterior boundaries of the overall geologic volume under study are defined.

The volume is divided along three orthogonal axes into a plurality of vertically superimposed and horizontally disposed layers. In the most sophisticated prior art modeling systems, grids representing geological time horizons are used to control lateral interpolation of geological parameters within columns of cells between these grids. This method of correlating well interval data to cells by ratio of vertical distances within sequences is described below. Although the surfaces represented by these grids may not be horizontal, the practice has been to make the layers in the model volume horizontal. Each layer is then divided into a plurality of cells, such that each layer resembles a grid, and each cell in each grid is part of a vertical column of cells, as well as part of a horizontal row of cells. All the horizontal edges of all the cells are equal in length, and the riser, being the height of every cell, is equal, and is selected to be a suitable measure in relation to the geologic volume in which the cells appear. Each geologic volume of interest, then, is modeled by a plurality of cells arranged in orthogonal grids of rows and vertical columns. Each cell can be systematically identified and handled by reference to its position in the several grids and columns in the three-dimensional model array. Modern computers with their extensive data storage and handling capacities are well suited for this service.

Known properties or parameters or attributes for each cell in a given volume between time horizon grids are then incorporated in the model. Thus, as an example, assuming one well provides data, the values of particular attributes within a well interval that apply to a particular cell are assigned to that cell. Interpolation is then made of the values of the same attributes for each cell in the columns to either side of the well. These interpolations may be made in several ways. As one example, if for a geologic sequence, a column in question is short and has only three vertical cells, and the well supplying data for the same sequence has a much greater vertical length, the well interval is divided into thirds. Then, either the average or the plurality of the values of the attribute and/or values of the top third of the well column are assigned to the top cell of the three-cell column. If the column in question consisted of only two cells, then the plurality or average of the attribute and/or values of the top half of the well interval would be assigned to the top cell of the two-cell column. If the column in question consisted of only one cell, then the plurality or average of the attribute and/or values in the entire well interval would be assigned to the one-cell column. Ultimately, then, it becomes possible to map values of various parameters for a given sequence at one or more given horizontal positions within the sequence.

The above system of modeling geologic volumes has been of some aid to geologists nd other persons who study such volumes. The system is of particular value in searching for and evaluating deposits of oil and gas. Nevertheless, the system has several shortcomings. A principal shortcoming is that the system does not take into account the fact that the present position of layers of a geologic sequence rarely, if ever, lie in a perfectly horizontal orientation. Although, as mentioned earlier, sedimentary layers are normally formed on a depositional surface which is essentially horizontal or on a sloping surface, this condition rarely persists after any substantial period of geologic time.

A stratigraphic sequence in nature is a volume or sub-volume of the earth's crust where depositional surfaces or time-lines (often strata boundaries) and surfaces such as unconformities, diastems, and surfaces of intrusive or diapiric masses (surfaces which define and bound a sequence) form a geometric style or pattern that sets it apart from other sequences; and where the stratigraphy and facies within the sequence may share a similar or common depositional history.

In general, any given natural stratigraphic sequence containing layers of rock may thicken, thin, be horizontal or sloping, or interact with unconformities or diastems to lead to a pattern or style of non-horizontal layers which is complex and varied. After deposition, structural movements with time can place the layers in an almost unlimited variety of attitudes; not simply horizontally stacked layers.

Modeling systems of the prior art, since they have horizontal layers, result in faulty or incomplete interpretations of data. For example, cells at a common depth at two laterally spaced wells are assumed by many prior art modeling systems to be in a common layer, but in reality may be from two different layers separated greatly in geologic time. Therefore, it often happens that interpreting data based on the assumption of horizontal layers results in an inaccurate interpretation.

The prior art modeling systems also fail to adequately take into account the different stratigraphic and structural configurations of layers which exist in nature. Varying configurations of stratigraphic patterns or styles are all treated alike in that the same basic type of modeling cell, and the same cell boundary surfaces, are used to model every pattern of stratigraphy within a geologic volume, even though the stratigraphic pattern or style within sequences may be varied and substantially different.

In summary, prior modeling processes have horizontal layers of cells of equal size, and with prior processes, data is interpreted into the cells by comparison and ratios. This all leads to inaccurate modeling of layered rocks in the earth's crust.

SUMMARY OF THE INVENTION

The above-noted and other drawbacks of the prior art are overcome by providing a process and apparatus for modeling geologic volumes which can achieve cell configurations uniquely adapted to the particular identity assumed for sub-volumes or geologic sequences within a modeled volume. It is believed to be the first device for and process of modeling geologic volumes which can achieve accurate modeling of geologic volumes and sequences and accurate interpolation and extrapolation of data within those sequences.

The present invention comprises a process for modeling natural geologic volumes which differs from the prior art in several aspects. First, it uses critical surfaces to divide up a geological volume into sub-volumes or stratigraphic sequences and/or structural blocks.

A modeled stratigraphic sequence is a volume where gridded surfaces representing and analogous to depositional surfaces, unconformities, diastems, and the surface of intrusive or diapiric masses form boundaries of the volume and also display a characteristic geometric pattern which sets a particular sequence apart from other sequences. The modeled stratigraphic sequence is analogous to a stratigraphic sequence in nature in which the geometric pattern of stratigraphy and the contained facies of rocks or deposits may be the result of a particular depositional history and depositional process.

A modeled structural block is a volume that is bounded by fault planes and stratigraphic surfaces such as depositional surfaces, unconformities, diastems, and/or surfaces of intrusive or diapiric masses; and is characterized by a particular stratigraphic pattern. The modeled structural block represents and is analogous to a block in nature in which the rocks or deposits share a similar or common structural evolution.

For the purpose of describing the invention, the term "bounded volume" shall be considered to be generic to both modeled stratigraphic sequences and modeled structural blocks.

The sequences and blocks divide a modeled volume into sub-volumes into which layers of cells are geometrically defined and placed according to the stratigraphic style or pattern or structural condition.

Second, the invention does not rely on horizontal layers of cells; instead it employs layers of cells which, when modeling sedimentary rocks or deposits, lie along and are approximately parallel to the time lines, strata boundaries, or depositional surfaces of the modeled strata. Other critical geological horizons or surfaces include unconformities, diastems, fault planes, and surfaces of intrusive or diapiric masses. The present invention, besides placing layers of cells which parallel time-lines and reflect the stratigraphic pattern or style, also place geologic layers at an attitude that reflects the result of subsequent structural movements and distortions that modify the initial horizontal or sloping depositional surfaces. The cells at opposite ends of a given model layer therefore correspond to the actual ends of the same geologic layer in the actual geologic volume, and changes along the layer reflect similar changes along the depositional surface or time line.

As with prior art modeling systems, the individual model layers employ cells which are arranged in rowed layers. The layers of cells may be stacked to form columns of cells defined by the grid dimensions. Looking at the geologic volume from points above the earth's surface, the x and y coordinates of the corners of all cells are equally spaced and correspond to grid spacing on grids representing the critical surfaces. However, in a third contrast with the prior art, the cells are rarely right-angle hexahedrons or parallelepipeds. The upper and lower boundary surfaces of the cells are rarely horizontal and under certain conditions are not parallel. Instead, with certain exceptions, they parallel the actual or assumed critical or stratigraphic surfaces to which they correspond. Thus, the vertical corner edges or risers of the cells of the invention vary in length to conform to the geometry of the layers in which they occur. Indeed, each corner edge for any given cell can vary in length as necessary.

As a fourth difference, the interpolation and extrapolation of data along each layer of cells is made independently of the interpolations and extrapolations along all other layers.

According to the method of the present invention, in modeling any given volume, the boundaries of the volume itself are first defined and entered into the model. The volume is then divided into stratigraphic sequences and structural blocks by critical surfaces which represent time lines or depositional surfaces, unconformities, diastems, fault planes, etc. These critical surfaces may be: (1) initiating surfaces which establish the conformation and attitude of cell layer boundaries within a sequence or block; (2) limiting surfaces which terminate and limit cell boundaries; or (3) phantom surfaces which shape and conform cell layers of sequences which have been radically altered by subsequent structural movement or erosion. Next, cell layer boundaries are placed in the sequences between the various critical surfaces according to the correct stratigraphic pattern and structural position. When possible, the cell layer boundaries are placed so that they approximately parallel the depositional surfaces or time lines characteristic of the sequence or block into which they are being placed.

Coordinates are assigned to each cell corner to locate the cell systematically within the model. The coordinates may conveniently be based on latitudes and longitudes, depth below sea level, x-y-z values, or any other suitable coordinate system.

Well logs are the most common data source used in modeling geological or engineering attributes and values, although seismic parameters such as surfaces, velocities, and amplitudes are examples of other data types that could be modeled. Data is usually input as vertical series of intervals which delineate the changes inherent in the data, whether it be qualitative discrete attributes or quantitative numerical values. The data are placed in the model according to the cell layers and cells to which they should stratigraphically and structurally pertain. The ultimate product, then, is a model of a given geologic volume in which all known or assumed geologic features and data of all types are depicted within the proper constraints of original deposition and stratigraphy and reflecting the effect of subsequent structural movement or erosion.

In another aspect of the invention, a set of layers in a given geologic sequence will be placed so as to reflect the configuration of a critical surface, which is thus called an initiating surface. The successive placement of the cell layers and their lateral extension and distribution may be limited by a second critical surface, thus called a limiting surface. Especially suitable for use as initiating or limiting surfaces are depositional surfaces, rock-strata boundaries, time lines, diastems, unconformities, or fault planes.

In another aspect of the invention, layers of cells within proportional or thickening/thinning sequences will usually have their upper and lower bounding surfaces not parallel. They will instead taper to conform to the shape of the sequence between the sequence bounding surfaces. It will be apparent in this instance that the individual cells within the cell layers will be similarly tapered, and their vertical corner edges will not all be equal in length. The cells in vertical cross-section may then resemble trapezoids, or perhaps even triangles, if the critical surfaces meet.

In another aspect of the invention, an irregular cell shape can occur at the extremity of a layer where the layer encounters a limiting surface. As will be more fully described later, a cell in this instance may take an unusual shape.

In another aspect of the invention, each cell layer is treated independently of all other layers. Data is interpolated between data points and extrapolated beyond data points within each independent cell layer. The method of interpolation and extrapolation depends upon whether the data are qualitative attributes or quantitative numerical data and upon the three-dimensional trend or distribution of attributes or values within each cell layer.

In still another aspect of the invention, a corresponding corner of each cell in a given stratigraphic sequence or structural block will be identified or typed by a set of coordinates that fit within an overall system or framework of coordinates. Possible coordinates include latitude, longitude, x-y-z values, and vertical distance from sea level. However, any consistent system may be employed. Specific cell data stored for an appropriate set of coordinates is virtually unlimited and may include lithology, porosity, water saturation, oil/water ratio, geochemical information, paleo data, and the like.

The data, once stored, may be recovered and presented in any of a variety of fashions. As mentioned previously, maps taken at different elevations or depths or along stratigraphic surfaces, and presenting particular types of parameters, are especially useful. In practice, the method of the invention is best carried out using computers for storing, processing, and outputting the data into the form of maps, cross sections, volumes, tables, and like products. The programming principles and needs are straightforward.

There are some programs commercially available that could be used with the invention for data management, grid construction, and graphic output. For example, mapping programs, such as RADIAN CPS, ZYCOR, and DYNAMIC GRAPHICS are well known. Also programs for file management systems and gridding systems are well known. Any modifications that might be required to interface these programs to the present invention would be minor and within the ability of persons skilled in the art of programming.

The above-noted and other aspects of the present invention will become more apparent from a detailed description of preferred embodiments when read in conjunction with the drawings.

BRIEF DESCRIPTION OF THE DRAWINGS

The invention will further be described by reference to the accompanying drawings which illustrate particular embodiments of the modeling method in accordance with the present invention, wherein like members bear like numerals and wherein:

FIG. 16b illustrates layers of cells constructed between naive or phantom grids for the proportional sequence 210 of FIG. 16a.

FIG. 16c illustrates the construction of layers of cells for the proportional sequence 210 of FIG. 16a.

DESCRIPTION OF A PREFERRED EMBODIMENT

The method of the present invention takes advantage of the observation that all sedimentary geologic sequences can be represented by one or a combination of the following five basic stratigraphic patterns (also called styles or modes):
1. Onlap
2. Offlap
3. Overlap
4. Thickening/Thinning
5. Truncation/erosion.

Onlap (FIG. 1a), offlap (FIG. 2a), and truncation (FIGS. 1e and 1f) are all special cases of a particular geological and geometric condition, namely where time lines, configuring to an initiating surface, terminate successively against a limiting surface. The planes representing the time lines are at an angle and not parallel to the plane representing a limiting surface.

Figure 1A:
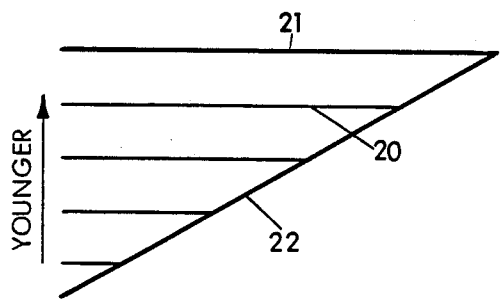
FIG. 1a is a two-dimensional section of a sedimentary volume showing an on-lap stratigraphic pattern of depositional surfaces or time lines.
Figure 1B:
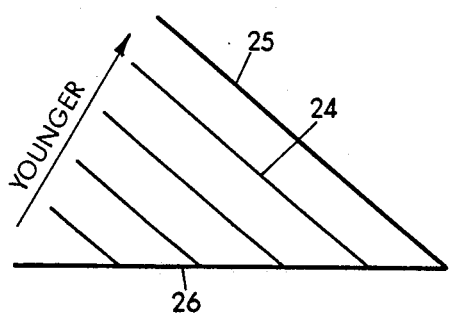
FIG. 1b is a section of a sedimentary volume showing an off-lap stratigraphic pattern of time lines.
Figure 1C:
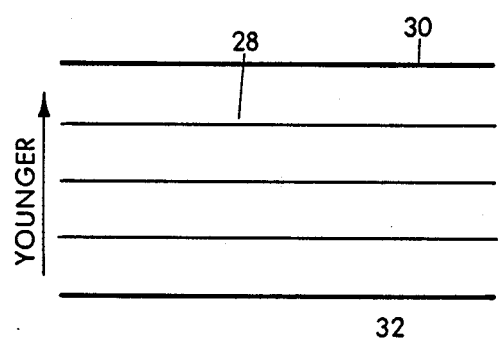
FIG. 1c is a section showing an overlap pattern of time lines.
Figure 1D:
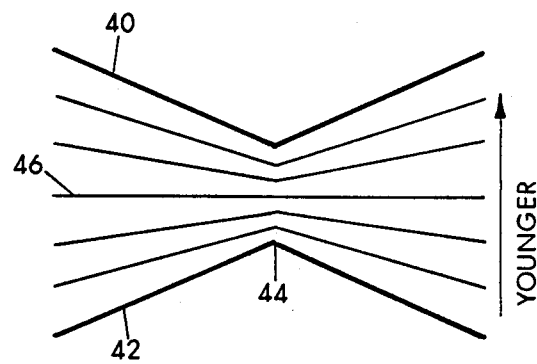
FIG. 1d is a section showing proportional spacing (thickening/thinning) pattern of time lines.

FIG. 1d shows a sequence which thickens and thins. The time lines are spaced proportionally as the thickening and thinning occurs. The bounding surfaces of the sequence both initiate and limit. FIG. 1c (overlap) is a special case of the proportional (thickening/thinning) sequence where the bounding surfaces of the sequence are essentially parallel.

FIGS. 1a-1f depict these five types. In each of these figures, the critical surfaces are indicated by the heavy lines. The lighter lines are intended to show how the sediments are layered within the various sequences and represent depositional surfaces or time lines. It will be observed that these lighter lines, with the exception of FIG. 1d, generally parallel one of the critical surfaces. The parallelism and constant vertical dimension suggest a relatively and approximately uniform deposition and/or distribution of the sediments during a given interval of time. The layers begin with an initiating critical surface and typically extend toward a limiting, non-initiating critical surface.

Referring specifically to FIG. 1a, this figure depicts an on-lap pattern in which sediments have been laid down such that each successive younger layer, or "time line", 20 extends laterally past the preceding layer to terminate against the limiting critical surface 22 at an oblique angle. Initiating surface 21 gives the form or pattern to the "time-lines" 20 that fill the sequence.

FIG. 1b shows an off-lap pattern in which each successively younger layer 24 extends and terminates beyond the previous ones upon the limiting surface 26. The initiating surface 25 gives the forms or patterns to the time lines 24 that fill the sequence.

FIG. 1c illustrates an over-lap pattern in which successive layers 28 are roughly horizontal and parallel to the critical surfaces 30 and 32.

FIG. 1d shows a proportional thickening-thinning pattern in which the layers of sediments 46 are thinnest at point 44 and thicken outward to the right and left. In doing so, the layers generally follow, but are not parallel to, the critical surfaces 40 and 42.

Figure 1E:
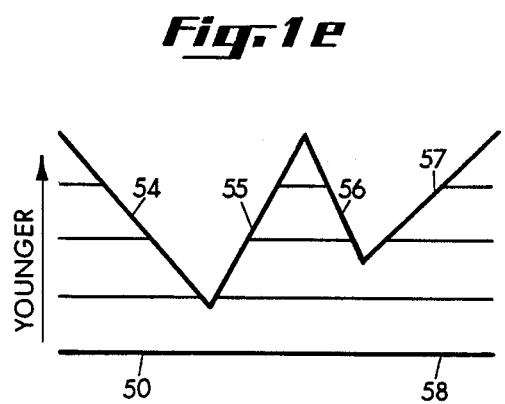
FIG. 1e is a section showing a form of truncation or erosion pattern of time lines.
Figure 1F:
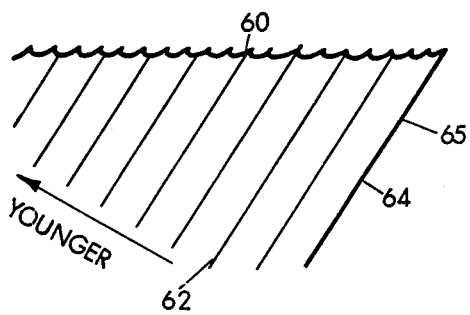
FIG. 1f is a section showing another form of truncation pattern of time lines.

FIGS. 1e and 1f depict a truncated pattern in which layers of sediments 50 and 62 have been truncated by an erosional surface defined by segments 54, 55, 56, 57, and 60. Originating surfaces 58 and 65 give the form or pattern to the time lines of the strata that are eroded or removed by processes occurring on the limiting surfaces 54, 55, 56, 57, and 60. Truncations of this nature have been generally caused by such actions as weathering and erosion.

Almost any selected geologic sequence or volume may consist of some or all of the types of patterns illustrated in FIGS. 1a–1f. In the method of the present invention, the mathematical representations of the critical surfaces, both initiating and limiting, are constructed after the mathematical representations of the boundaries of the selected geologic volume are constructed. In constructing the mathematical representations of the critical surfaces of a geologic volume within the selected boundaries of the model, the data relied upon may include known outcrop information, seismic profiles, magnetic and gravity survey data, paleo and geochemical data, well locations, well logs, etc. Known detailed data will normally come from many of these same sources, but notably from outcrop and well data of all types.

FIGS. 2a–2d illustrate some of the various configurations of a cell 68 that may result in using the method of the invention to mathematically model a geologic volume. As generally explained earlier, the method of the invention divides each geologic sequence into a plurality of layers of cells which are intended to follow the natural layering of strata within the sequence. The most common cell will normally be a hexahedron having four vertical corner edges. The corner edges may vary in length to fit whatever geometry they must accommodate.

Figure 2A:
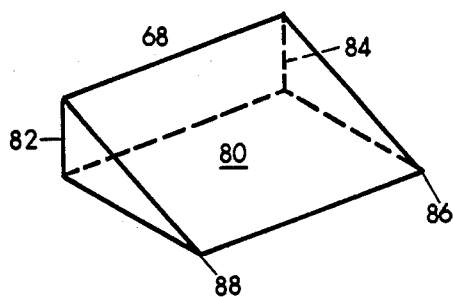
FIG. 2a is a perspective view of a cell in which two corner risers are zero and two corner risers are equal length.
Figure 2B:
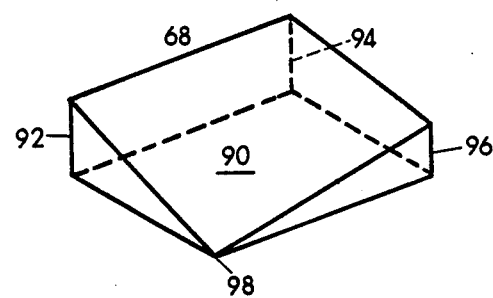
FIG. 2b is a perspective view of a cell in which one corner riser is zero, two corner risers are of equal length, and a fourth corner riser is of a different length.
Figure 2C:
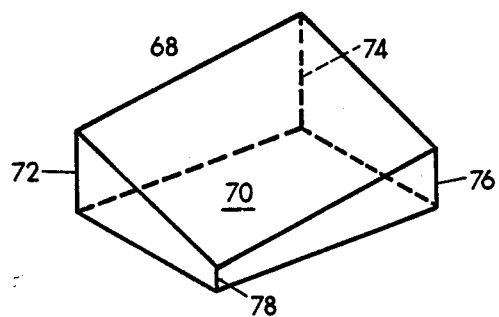
FIG. 2c is a perspective view of a cell in which the four corner risers are all different lengths.
Figure 2D:
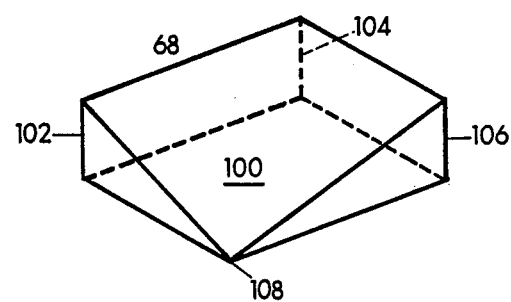
FIG. 2d is a perspective view of a cell in which three corner risers are of equal length, and one corner riser is of zero length.

Thus, FIG. 2c depicts a cell 68 having a square planar base 70 and four vertical corner risers 72, 74, 76 and 78, all of different lengths. FIG. 2a depicts a cell 68 having a square planar base 80 and four vertical corner risers 82, 84, 86, and 88. The length of the risers 82 and 84 are equal, and the length of the risers 86 and 88 is zero. FIG. 2b depicts a cell having a square planar base 90 and two corner risers 92 and 94 equal in length. A third riser 96 is of a different length, and a fourth riser 98 has a length of zero. FIG. 2d depicts a cell having a square planar base 100 and three vertical corner risers 102, 104, and 106 of equal length, and a fourth riser 108 of zero length. Some cells may even have all four risers be of zero length. Referring now to FIG. 16c, when constructing a model of the geologic sequence 210 illustrated in those figures, the arcuate line between points 236 and 238 may be considered to comprise numerous layers of cells whose risers are all of zero length.

Figure 2E:
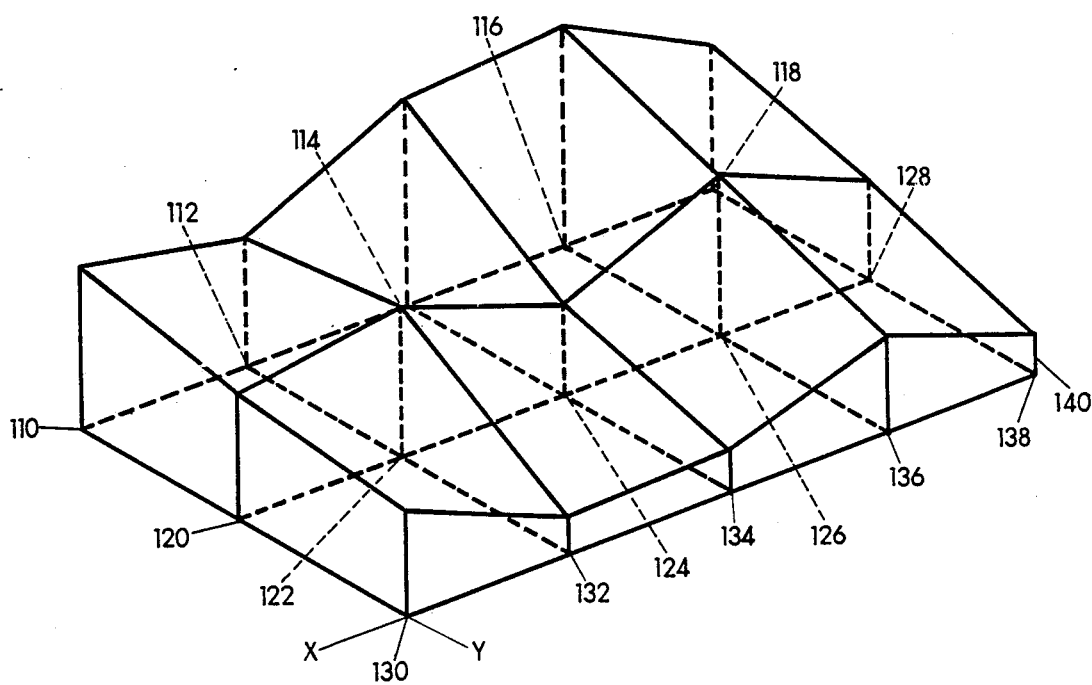
FIG. 2e is a section of a geological volume showing how the cells of the invention may take different configurations in different parts of the same model.

Many applications of the method of the present invention will not require a visual display of the model of a selected geologic volume. However, to illustrate the variable sizes of the cells 68 that can be achieved according to the method of the present invention, FIG. 2e depicts eight adjacent cells. Points 110 through 138 form an x-y grid. Those points are all equally spaced in the x,y directions. However, the risers, such as riser 140, have different lengths.

Figure 3A:
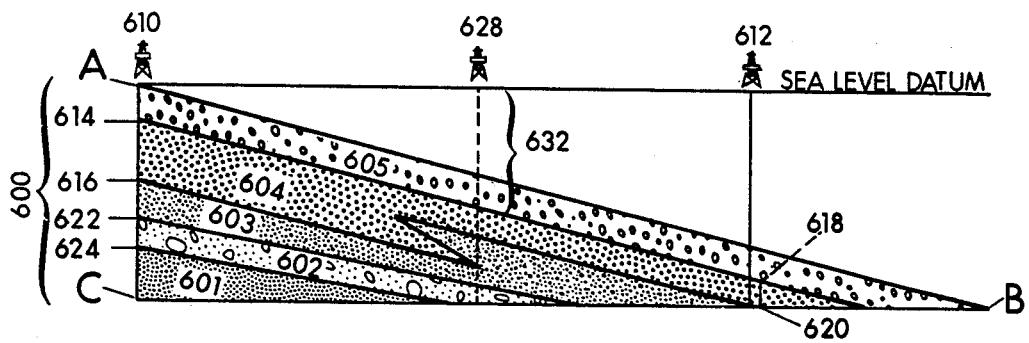
FIG. 3a is a cross section through a three-dimensional volume illustrating the actual type and position of sediment layers or "state of nature".

FIG. 3a shows a two-dimensional cross-section through a three-dimensional volume representing the actual state of nature within the volume. The cross section wedge 600 is a stratigraphic sequence and is essentially bounded by critical surfaces AB and CB. Lithologies 601, 602, 603, 604, and 605 occur as definite intervals in a well 610 and a well 612. The lateral relationship, changes, and attitudes of these lithologies in the cross section wedge 600 are an interpretation of the "state of nature" between wells 610 and 612 (and beyond well 612) and is based upon the observed or assumed stratigraphic pattern of offlap occurring within the cross section wedge 600. The important lithology 604 is present in the interval 614–616 in the well 610. It continues down across the sequence in a contiguous manner and is present in the interval 618–620 of well 612. If the lithology 604 is a porous reservoir deposit, fluids, gas, and pressure would be in communication throughout the sequence. Lithology 602 is present in interval 622–624 (well 610), continues down through the sequence in a contiguous manner and terminates against the limiting surface C-B.

Figure 3B:
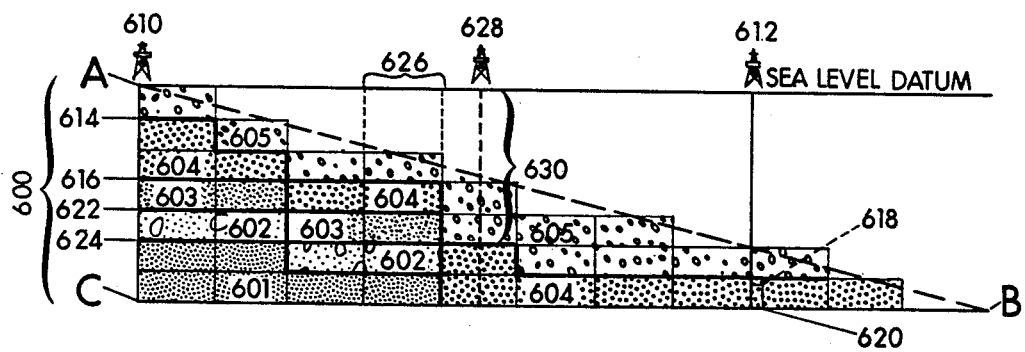
FIG. 3b illustrates a prior art model, of the state-of-nature shown in FIG. 3a which uses horizontal layers of cells to model a geologic sequence.

FIG. 3b is a two-dimensional cross-section of a prior art three-dimensional cellular model. The cells are of the same shape and size and are in horizontal layers. The lithology attributes are assigned to the cells by a method whereby individual columns of cells are compared to the nearest well data (recorded by interval) and lithologies (or any other attributes or values) are assigned by a ratio method. For example, a column of cells 626 (FIG. 3b) contains five cells within the modeled sequence. This column 626 is compared to the nearest well 610 and the lithologies (or any other attribute or value) is assigned by dividing the well sequence interval into fifths and assigning whatever lithology is the majority of the top fifth to the top cell in cell column 626. The majority lithology in the second from the top fifth in the well 610 sequence interval is assigned to the second from the top cell of the cell column 626. This method of assigning attributes and/or values combined with horizontal layers of cells gives the distribution of lithologies as shown in FIG. 3b. Examination shows that there is little similarity between the modeled distribution of lithologies in FIG. 3b and the state of nature as shown in FIG. 3a. If the illustrated sequence were an oil, gas, or water reservoir model and porous lithology 604 were a continuous and contiguous porous reservoir, the prior-art model in FIG. 3b would vary from the state of nature in several important ways:

(1) The porous lithology 604 is not portrayed as a continuous and contiguous body as it is portrayed in FIG. 3a. As modeled, simulated fluids, gases, and pressures could not have free movement throughout the porous lithology 604.

(2) The modeled thicknesses (and hence volumes) portrayed for the porous lithology 604 in the prior art model are not correct in measurement or distribution.

(3) The expected spatial location (as an interval measured from a sea level datum) of the porous lithology 604 in the prior art model does not correspond to the state-of-nature example (comparison of intervals 632 and 630).

Figure 12:
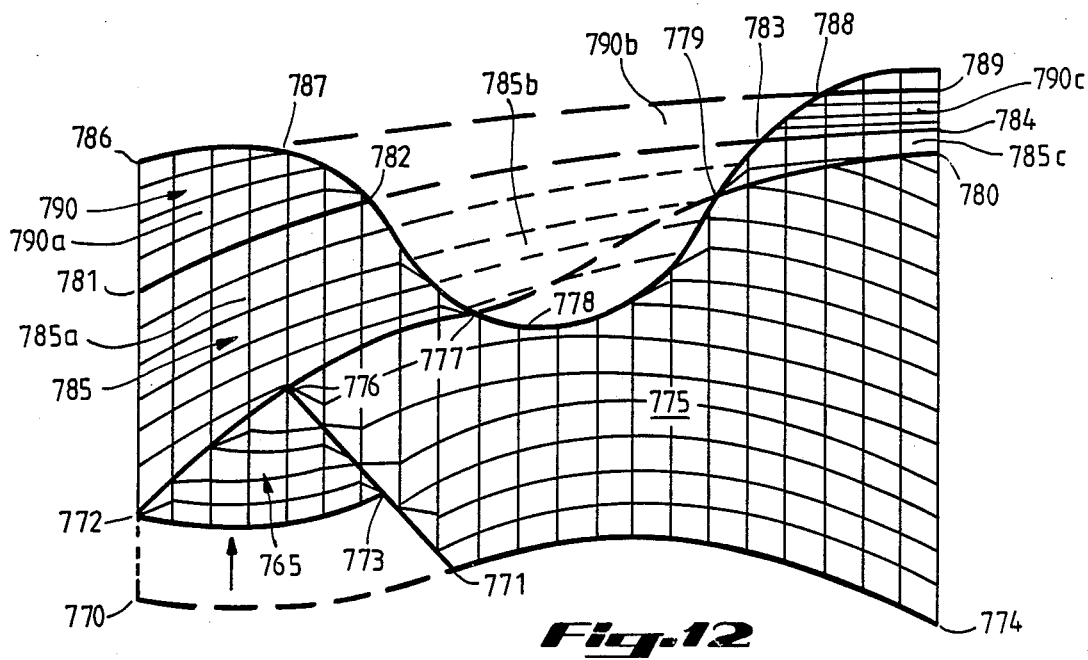
FIG. 12 illustrates phantom surfaces used in the process according to the present invention.

(4) Lithology 602 does not, in FIG. 3b, terminate against surface C-B, nor does it reach a possible future well location 628. However, as shown in FIG. 12, lithology 602 in nature terminates against surface C-B and reaches the location 628.

If the example sequence were modeled as an exploration model in FIG. 3b, the predicted depth below a sea level datum to the first occurrence of the porous lithology 604 in the model (interval 630) is much greater than the actual interval 632 in the state-of-nature example. This could lead to faulty exploration interpretations.

Figure 3C:
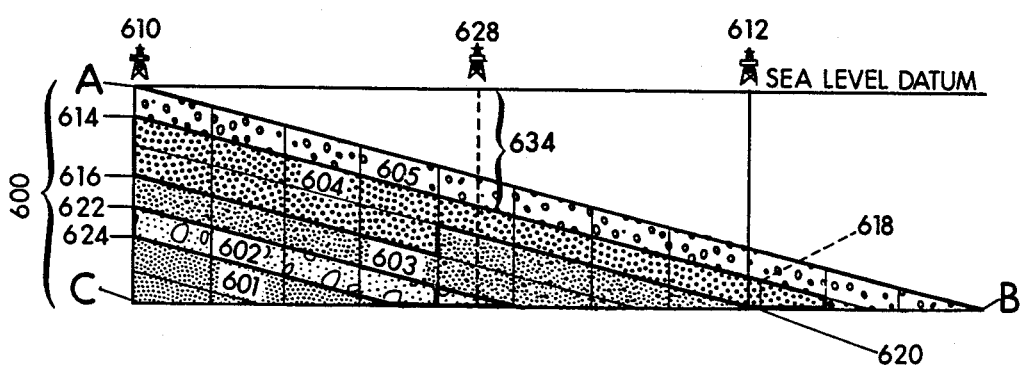
FIG. 3c illustrates modeling the geologic sequence of the state-of-nature (FIG. 3a) according to the present invention.

FIG. 3c shows a two-dimensional section of the cross-section wedge 600 modeled in three dimensions according to the process of the present invention. It should be noted that in the modeling process of the present invention:

(1) The cells are approximately parallel to depositional surfaces and time lines associated with the modeled lithologies. Thus, the layers of cells parallel the attitude of the strata. In other words, the cell layers are approximately parallel to the boundaries between lithologies 601, 602, 603, 604, and 605.

(2) Cells are not parallelepipids or cubes but are instead rhomboids, trapezoids, or trianguloids.

(3) Some cell sizes vary in the vertical dimension.

(4) The lithologies 601, 602, 603, 604, and 605 are modeled and portrayed in a similar manner as they exist in the state-of-nature sequence of FIG. 3a.

- (a) Porous lithology 604 is modeled as a continuous and contiguous body and would allow the flow of fluids, gases, and pressures through it.
- (b) The modeled thickness and distribution of thickness of lithology 604 in the invention model is closely analogous to thicknesses in the state-of-nature model (FIG. 3a).
- (c) The vertical distance below the sea level datum to the first occurrence of lithology 604 is interval 634 and is almost exactly the same as the similar interval 632 in the state-of-nature sequence in FIG. 3a.
- (d) Lithology 602 in the invention model does terminate against the surface C-B, and is projected into the future well location 628, closely analogous to the state-of-nature sequence of FIG. 3a.

The volume to be modeled can be of any size with varying types and amounts of data available that describe either discrete attributes or numerical values. Usually the volume modeled varies in size from tens of acre feet, when modeling mineral deposits or engineering models to thousands of cubic miles when making exploration, environmental, or ground water models.

THE PROCESS STEPS: GENERAL EXPLANATION

The following section gives a digested step-by-step summary of the process according to the present invention for modeling the earth's crust.

Figure 4:
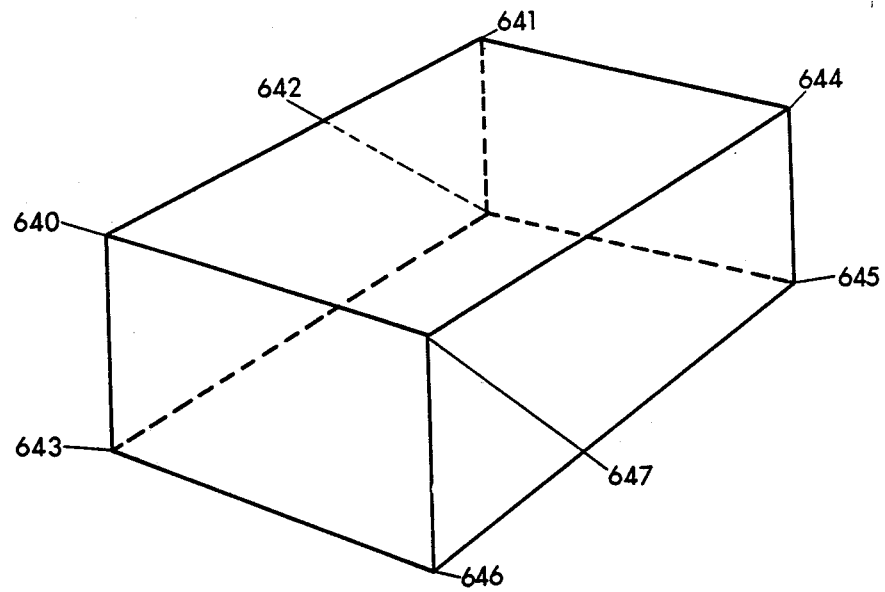
FIG. 4 illustrates a theoretical volume of the earth's crust to be modeled according to the process of the present invention.

STEP 1: Referring now to FIG. 4, conceptually the volume to be modeled is defined by four arbitrarily selected vertical planes (640-641-642-643, 641-644-645-642, 644-645-646-647, and 640-643-646-647) and upper and lower surfaces (640-641-644-647 and 643-642-645-646).

Figure 5:
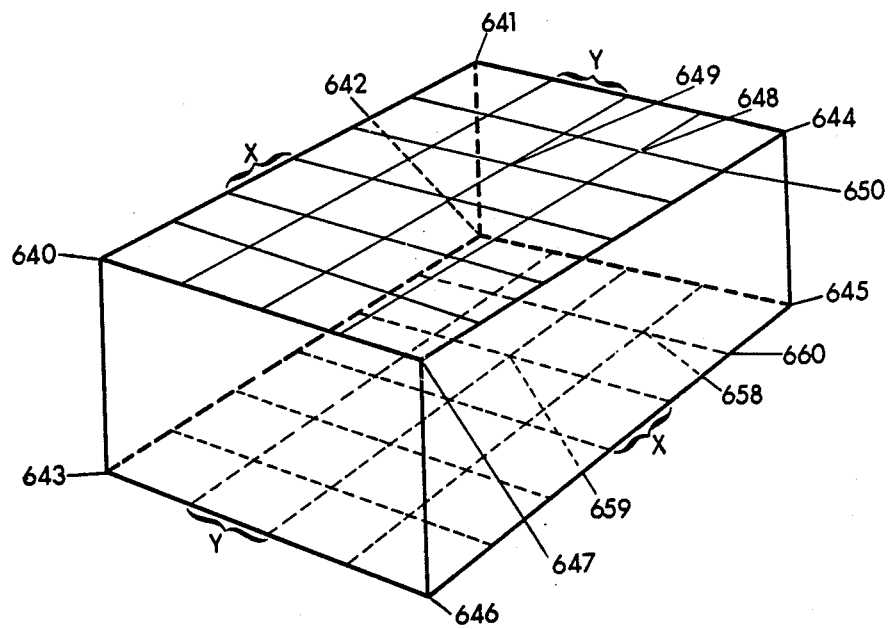
FIG. 5 illustrates a model of the volume of FIG. 4 with gridded values of the upper and lower bounding surfaces introduced into the model.

STEP 2: Referring now to FIG. 5, the upper and lower bounding surfaces are introduced as gridded values calculated from elevation data and with grid spacing equal in the x and y direction. The grid spacing is specified by the user, and calculations of elevation below a sea level datum are made at each grid intersection from data available (usually well or seismic data).

In FIG. 5, all of the x-y intervals, grid dimensions, on both gridded surfaces 640-641-644-647 and 643-642-645-646 are equal in length and specified by the user (often depending on the amount and spacing of the data). The grid intersections of the gridded surfaces 640-641-644-647 and 643-642-645-646 coincide vertically with each other. For example, the grid intersections 648, 649, and 650 of gridded surface 640-641-644-647 lie directly vertically above the equivalent grid intersections 658, 659, and 660 in the gridded surface 643-642-645-646.

Figure 6:
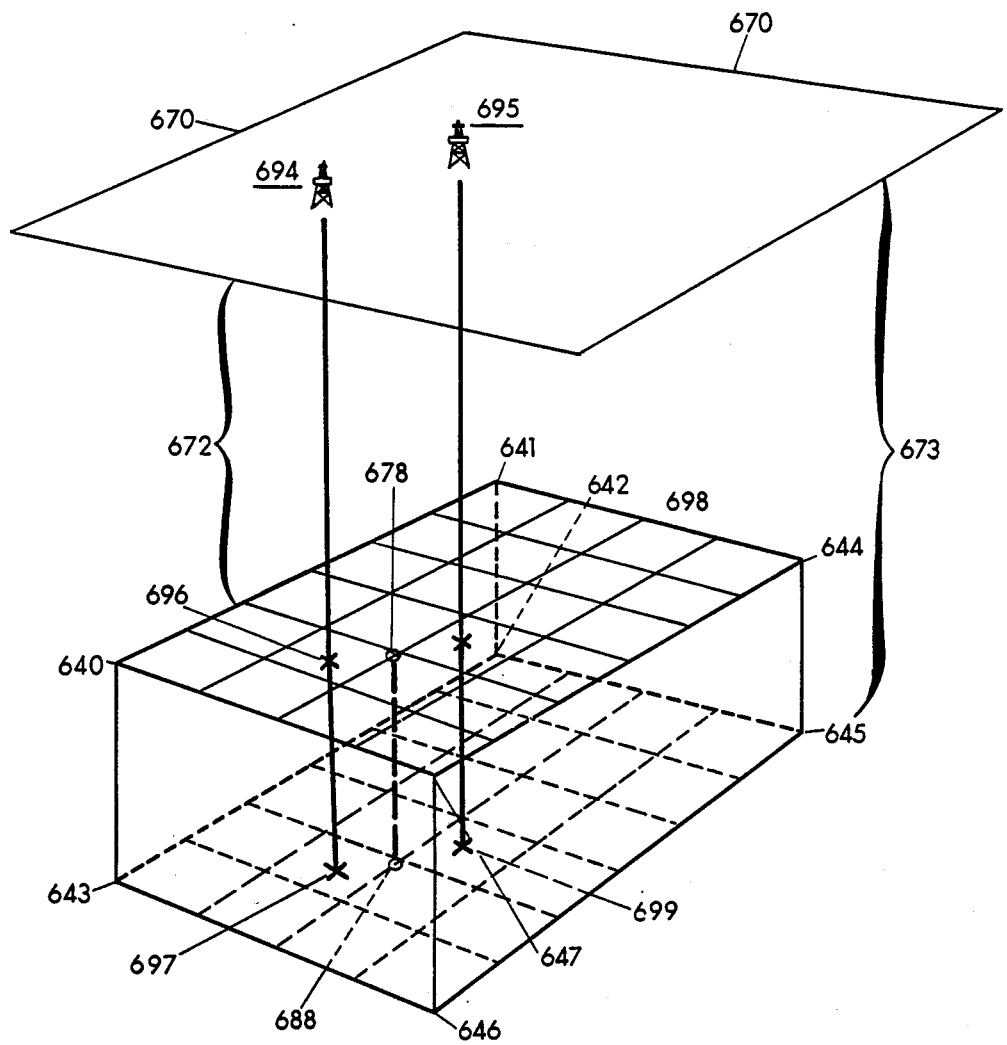
FIG. 6 illustrates the relationship of the depths of the bounding surfaces of the model of FIG. 5 to a sea level datum.

The shape and attitude of the surfaces 640-641-644-647 and 643-642-645-646 are actually described by calculations made at the grid intersections. Referring now to FIG. 6, the calculations for critical or bounding surfaces are usually in feet below a sea level datum 670. The data for making the grid calculations are usually from "picks" or "tops" of critical horizons as indicated by well logs or seismic data. There are numerous commercially available software that use data and quite accurately make the grid calculations for describing a surface. These gridding systems use mathematical methods for searching nearby wells and making the best possible grid intersection calculations so that the resulting total grid will quite closely approximate the desired surface. The invention will use gridded data from one of these software systems as an external source and will input the grids into the process of modeling according to the present invention.

Referring again to FIG. 6, a value 672 at a grid intersection 678 will be calculated as a distance, measured in feet, below sea level. A value 673 at a corresponding grid intersection 688 will be a distance measured in feet below sea level. Both calculations will be based on where the surfaces 640-641-644-647 and 643-642-645-646 cut the wells or data points nearest the grid intersection. For example, at the intersections 678 and 688, the depths below sea level at which surfaces 640-641-644-647 and 643-642-645-646 cut wells 694 and 695 (at points 696, 697, 698, and 699) will provide the data for making the grid calculations at the grid intersections 678 and 688. In subsequent figures, for simplicity, two-dimensional sections will be used. However, they are meant to reflect the whole three-dimensional volume.

STEP 3: After the modeled volume is defined, if there is enough information available to the user, the overall volume is divided into bounded subvolumes called stratigraphic sequences and structural blocks. Cell layers will then be placed into each sequence or block so that the cell layers will approximately parallel the strata, strata boundaries, depositional surfaces, and/or time lines that are present in nature within these sequences and block subvolumes. The overall or principal volume is divided into sequence and block subvolumes by gridded surfaces that are called critical geological surfaces. These critical surfaces may be (1) depositional surfaces;
(2) boundaries between strata;
(3) unconformities;
(4) diastems;
(5) fault planes;
(6) surfaces of intrusive or diapiric masses; or
(7) phantom or naive surfaces for cell placement.

Figure 7:
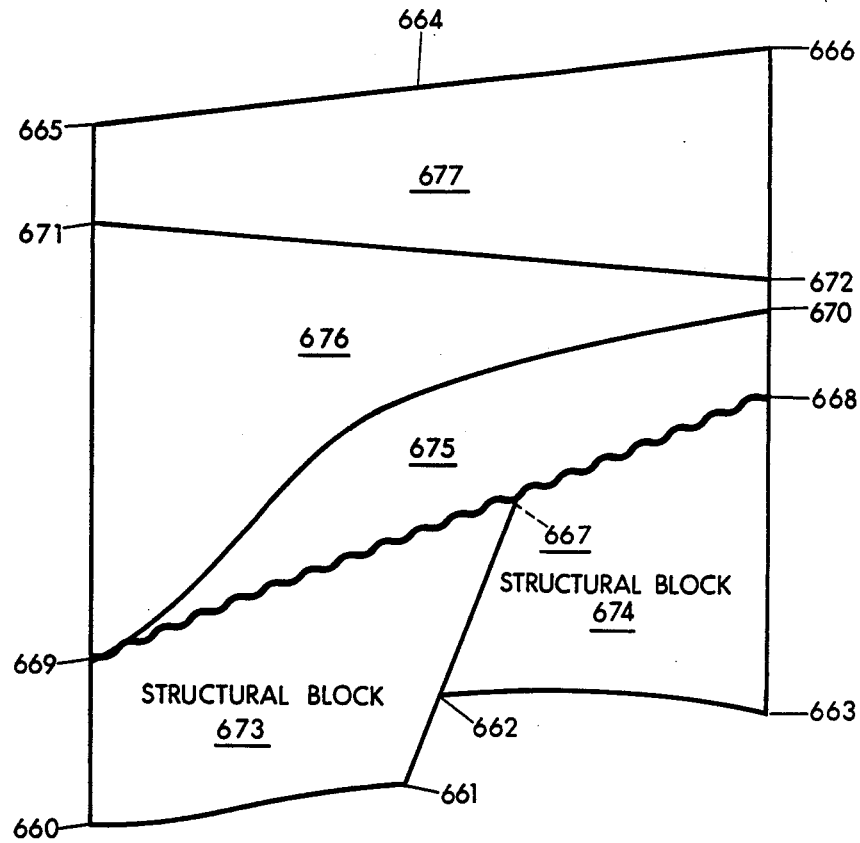
FIG. 7 illustrates a possible cross-section of a modeled volume showing sub-volumes which are stratigraphic sequences and structural blocks.

Referring now to FIG. 7, if a modeled volume does not have two or more differing stratigraphic sequences or structural blocks, the above gridded critical surfaces will define and form the boundaries between the sequences and blocks. FIG. 7 shows a cross section 664 through a modeled volume.

The following are the critical surfaces in FIG. 7. A surface 660-661-662-663 is the bottom of an overall cross-section 664. A surface 665-666 is the top of the overall cross-section 664. A generated surface 660-661-667-668 includes a fault plane in the cross-section 664 as well as the top and base of a sequence. A surface 669-667-668 is an unconformity in the cross-section 664. A surface 669-670 is a diastem in the cross-section 664. A surface 671-672 is a depositional surface, time line, or strata boundary in the cross-section 664. A structural block 673 is defined by critical surface 660-661-662-667-668 and 669-667-668. A structural block 674 is defined by critical surfaces 660-661-662-667-668 and 660-661-662-663. A stratigraphic sequence 675 is defined by critical surfaces 669-667-668 and 669-670. A stratigraphic sequence 676 is defined by critical surfaces 669-670 and 671-672. A stratigraphic sequence 677 is defined by critical surfaces 671-672 and 665-666.

The number, size, shape, and detail of the stratigraphic sequence and structural block subvolumes depends upon the accuracy, spacing, and density of data.

In the preferred form of the process of the present invention, the user of the process knows whether or not two or more sequence subvolumes exist and whether or not structural blocks exist. In order to insure accuracy in the sequence and block subvolume's size, shape, and detail, the process of the present invention must have as input enough accurate, properly spaced data to grid the critical surfaces that bound and describe the sequences and blocks. In order to properly place the cell layers within the sequences and blocks, the user of the present invention must know the stratigraphic pattern or patterns involved in a sequence (onlap, offlap, truncation, proportional thickening/thinning, etc.) and the location and attitude of surfaces representing fault planes that separate structural blocks.

Figure 8:
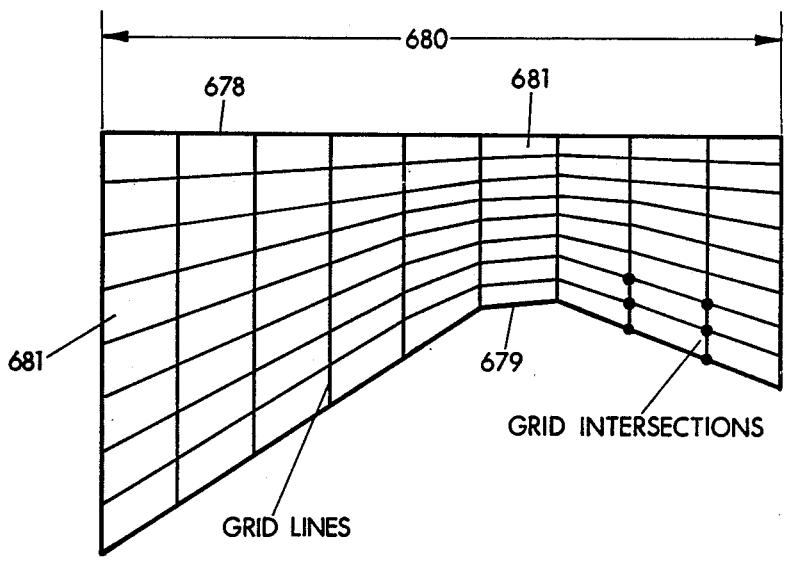
FIG. 8 illustrates a proportional spacing pattern within the process according to the present invention for placing cell layers in a model when little information is available.

STEP 4: Often, when modeling for exploration, ground water, engineering, or environmental purposes, only widely spaced and sparse data is available. Therefore, the user cannot divide the gross volume into sequences and blocks. Even if he could, he would not have the information to properly place the cell layers within the sequences and blocks. Referring now to FIG. 8, in cases such as this where little information is available, yet a model is desired, the process according to the present invention uses the proportional pattern for placing cell layers in a model. In this mode, the process uses as critical surfaces only a top bounding surface 678 and a bottom bounding surface 679 of the gross volume 680 and places cells 681 throughout the gross volume 680 in a proportional thickening/thinning manner.

STEP 5: If (1) there is enough information available to grid surfaces that will bound and describe the various sequences and blocks, and, if (2) enough geological information is available to interpret the stratigraphic patterns or modes within the sequences and blocks, then the process according to the present invention places layers of cells in a unique manner within each sequence and block according to the stratigraphic framework, pattern, or style within the sequences and/or blocks.

As mentioned earlier, the process of the present invention recognizes and utilizes five basic stratigraphic patterns (also called modes or styles) for placing cell layers within sequences or blocks: ONLAP, OFFLAP, TRUNCATION, PROPORTIONAL, and OVERLAP. They are illustrated in FIG. 1 and FIG. 9. The stratigraphic patterns show particular relationships between the critical surfaces that bound and describe a sequence and the surfaces that bound the cell layers within the sequence. The stratigraphic patterns are unique and display characteristic geometric relationships between two types of surfaces. One type of surface reflects the attitude of, and is approximately parallel to, depositional surfaces. These depositional surfaces are also called time lines or strata boundaries. These surfaces are actually surfaces that bound and separate layers of cells that the process of the present invention places within sequences and blocks; and are analogous to and approximately parallel to the depositional surfaces or time-lines of the rocks being modeled (also boundary between rock strata). The other type of surface is the critical surface which bounds and describes sequences and/or blocks. The critical surfaces usually represent depositional surfaces, unconformities, diastems, fault planes, and/or the surfaces of intrusive or diapiric bodies. They are either (1) initiating surfaces whose shape and attitude determine the subsequent attitude and shape of cell layers that are placed within a sequence, (2) limiting surfaces that terminate, limit, and/or shape the cell layers, or (3) surfaces that bound a sequence.

Figure 9A:
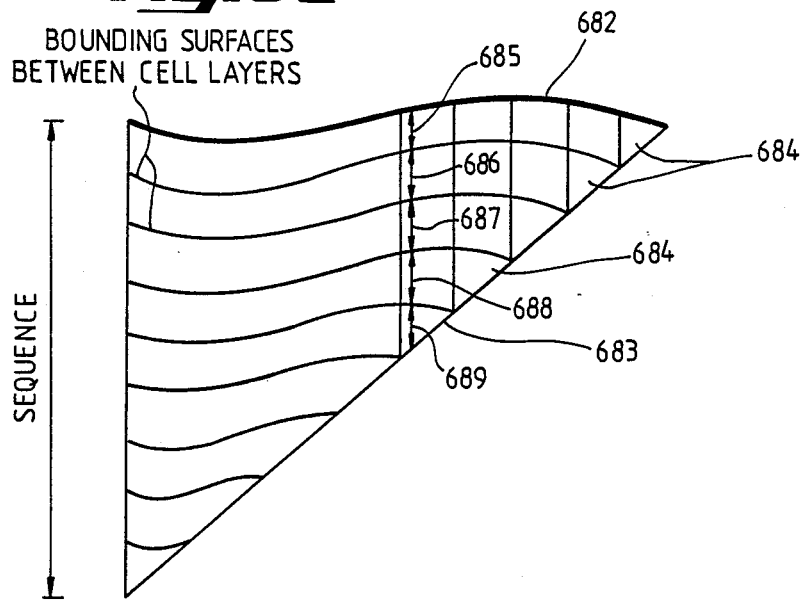
FIG. 9a illustrates the ONLAP pattern, mode, or style of the process according to the present invention.

FIG. 9a illustrates the ONLAP mode. In FIG. 9a, a surface 682 is an initiating critical surface that sets the attitude and shape of the cell layers and their bounding surfaces which fill the sequence. A surface 683 is a limiting critical surface and limits and terminates the lateral extension or distribution of cells with thicknesses greater than zero. It also shapes terminating cells 684. A terminating cell is a cell which has a top or base elevation at one or more x,y coordinates that contacts a limiting critical surface. Terminating cells can have zero height risers. That is, the top and base elevation values can be equal at any or all x,y coordinates. The surface 683 may be an unconformity, diastem, the surface of an intrusive or diapiric body, or a fault plane. Distances 685, 686, 687, 688, and 689 are the vertical thicknesses of the individual cells and cell layers. Those distances are the same, and are equal, throughout the sequence except where encountering limiting surfaces.

Figure 9B:
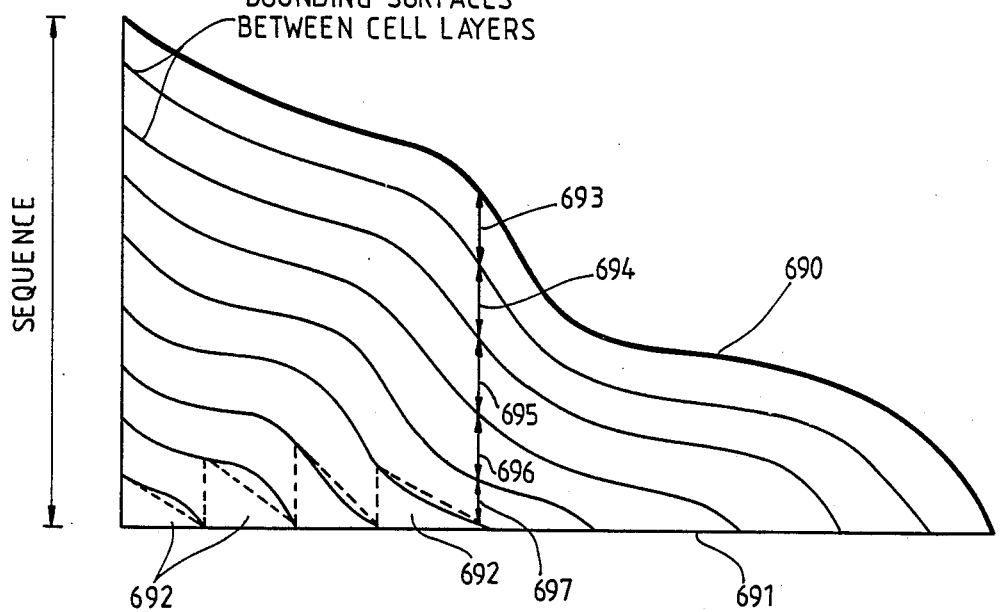
FIG. 9b illustrates the OFFLAP pattern, or mode, of the process according to the present invention.

FIG. 9b illustrates the OFFLAP mode. In FIG. 9b, a surface 690 is an initiating critical surface that sets the attitude and shape of the cell layers and their bounding surfaces which fill the sequence. A surface 691 is a limiting critical surface and limits and terminates the lateral distribution and extension of cells with thicknesses greater than zero. It also shapes terminating cells 692. The surface 691 may be an unconformity, diastem, the surface of an intrusive or diapiric body, or a fault plane. Distances 693, 694, 695, 696, 697 are the vertical thicknesses of the individual cell layers. These distances are the same, and are equal, throughout the sequence except when encountering limiting surfaces.

Figure 9C:
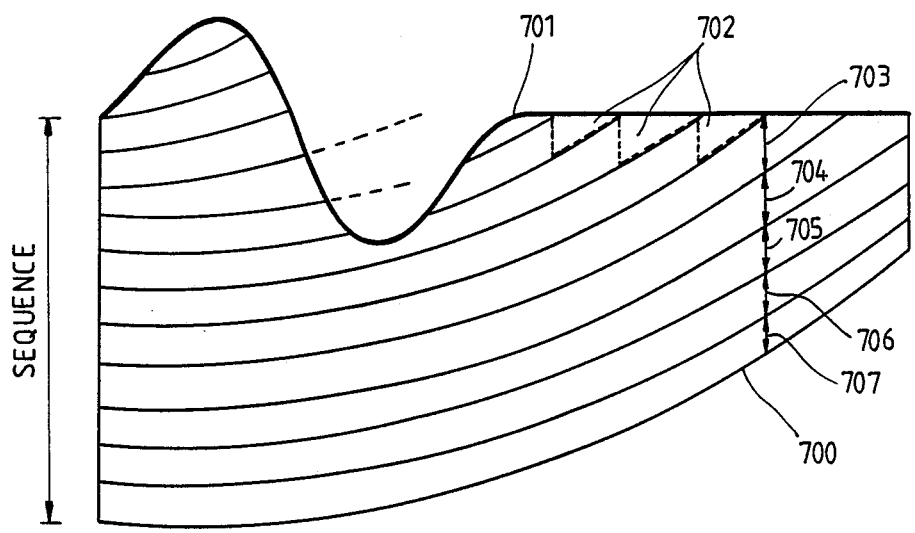
FIG. 9c illustrates the TRUNCATION pattern, or mode, of the process, according to the present invention.

FIG. 9c illustrates the TRUNCATION mode. In FIG. 9c, a surface 700 is an initiating critical surface that sets the attitude and shape of the cell layers and their bounding surfaces which fill the sequence. A surface 701 is a limiting critical surface and limits and terminates the lateral distributions and extensions of cells with thicknesses greater than zero. It also shapes terminating cells 702. The surface 701 may be an unconformity, diastem, the surface of an intrusive or diapiric body, or a fault plane. Distances 703, 704, 705, 706, and 707 are the vertical thicknesses of the individual cell layers. These distances are the same, and are equal, throughout the sequence except when encountering limiting surfaces.

Figure 9D:
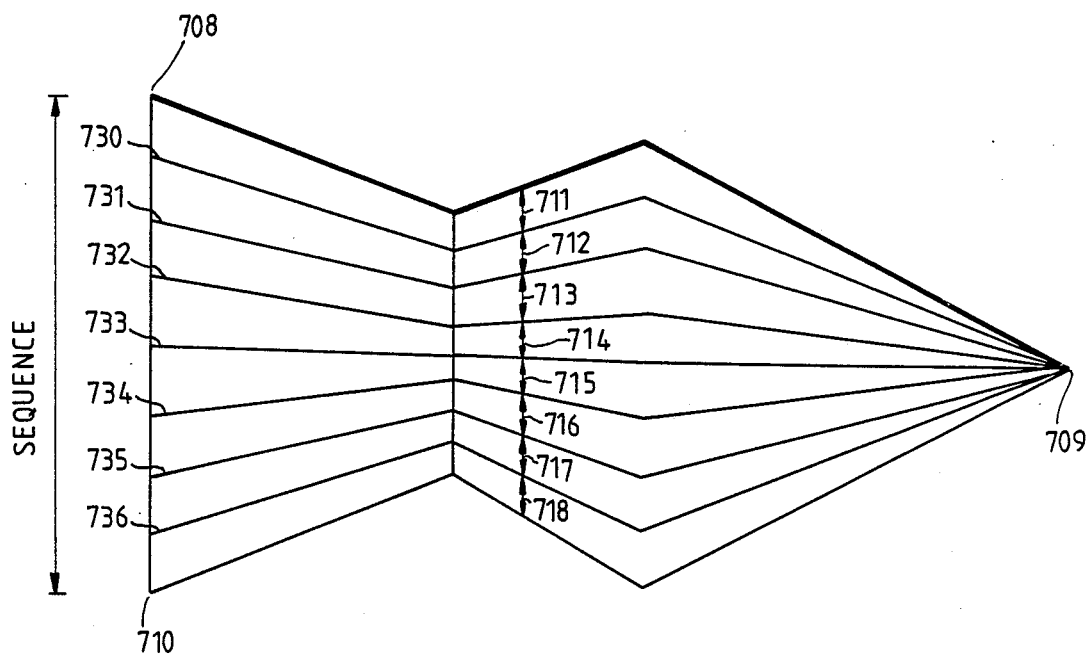
FIG. 9d illustrates the PROPORTIONAL pattern, or mode, of the process according to the present invention.

FIG. 9d illustrates the PROPORTIONAL THINNING/THICKENING mode. In FIG. 9d, surfaces 708-709 and 709-710 are both initiating surfaces. Intervals (vertical distances) 711, 712, 713, 714, 715, 716, 717, and 718 are equal in length along any vertical line within the sequence but they may vary laterally throughout the sequence of FIG. 9d.

Figure 10A:
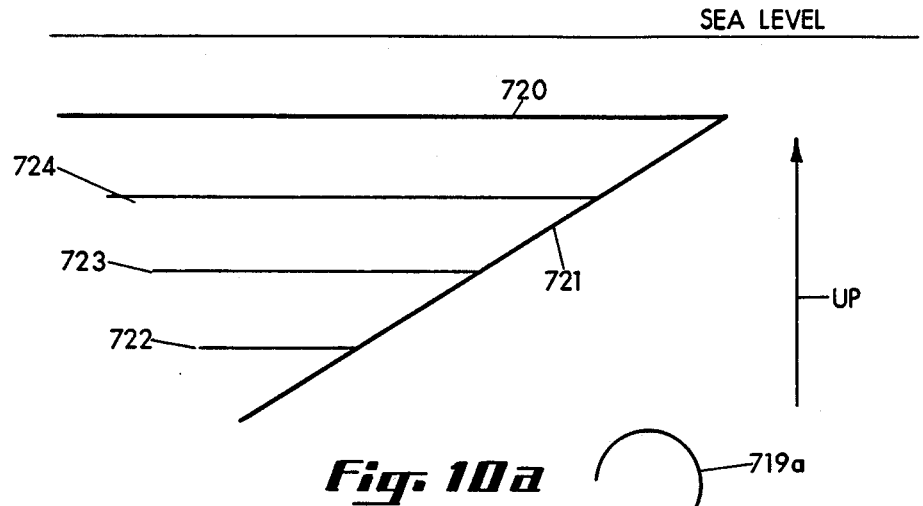
FIGS. 10a-c illustrate the geometric similarities between the ONLAP, OFFLAP, and TRUNCATION patterns, or modes, of the process according to the present invention.
Figure 10B:
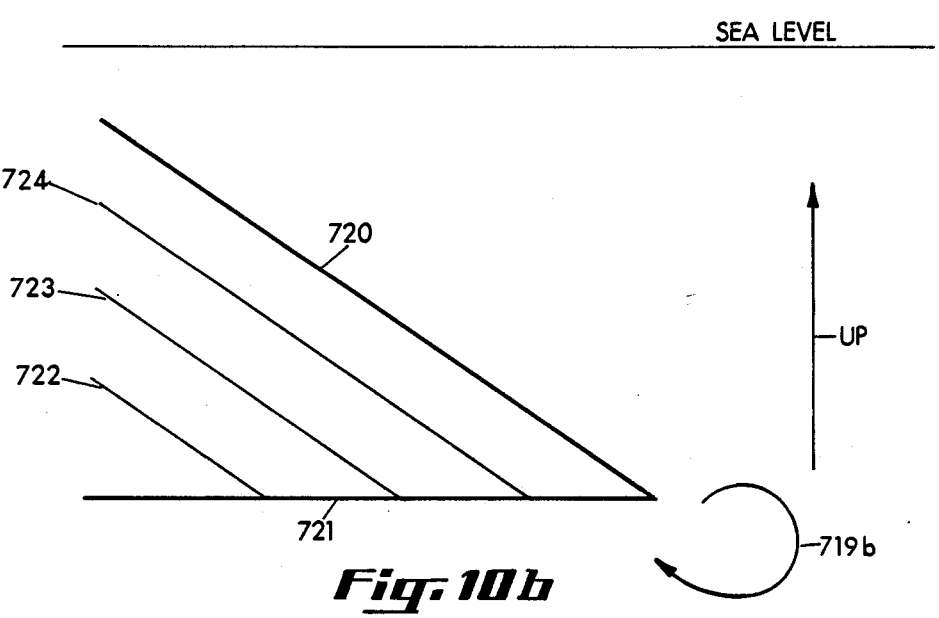
Figure 10C:
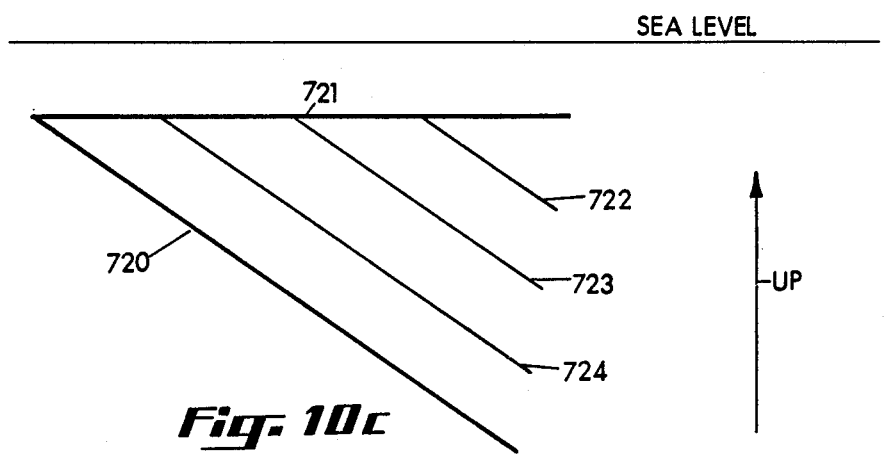

Referring now to FIG. 10, when carefully examined, the oblique patterns of onlap (FIG. 10a), offlap (FIG. 10b), and truncation (FIG. 10c) show a similar geometric pattern and are rotations 719a and 719b (referred to sea level) of the same basic geometric relationship between the surfaces bounding cell layers and the initiating and limiting surfaces. This relationship is called oblique and these patterns are oblique patterns.

The basic oblique geometric relationship present in the elements of onlap, offlap, and truncation can be abstracted and summarized as:

(1) Two critical surfaces 720 and 721 (initiating and limiting surfaces, respectively) that define the pattern or sequence are essentially not parallel.

(2) The shape and attitude of surfaces 722, 723, and 724 bounding the cell layers are analogous to and approximately parallel to depositional surfaces and are parallel to and determined by the shape and attitude of the initiating surface 720.

(3) The surfaces 722, 723, and 724 bounding the cell layers terminate against the limiting surface 721.

The above abstraction of the geometry of the oblique patterns onlap, offlap, and truncation allow similar basic programming for the placement of cell layers in those patterns.

The proportional (thickening/thinning) element or mode is different in geometric concept from the onlap, offlap, and truncation elements in which cell layers essentially parallel one critical surface and terminate against another critical surface.

Referring again to FIG. 9d, in the proportional element, surfaces 730, 731, 732, 733, 734, 735, and 736 bounding the cell layers are analogous to and approximately parallel to depositional surfaces, but are rarely parallel to either of the critical bounding surfaces 708-709 and 709-710 or to each other. The surfaces forming boundaries between cell layers are instead proportioned out between the critical boundaries so that (1) there is always the same number of cell layers throughout the element, (2) along a vertical line at a single x,y coordinate the vertical thickness (711, 712, 713, 714, 715, 716, 717, 718) of each cell is equal, and (3) laterally along the individual cell layers the vertical distance changes as the distance between the bounding critical surfaces 708-709 and 709-710 varies.

Figure 11:
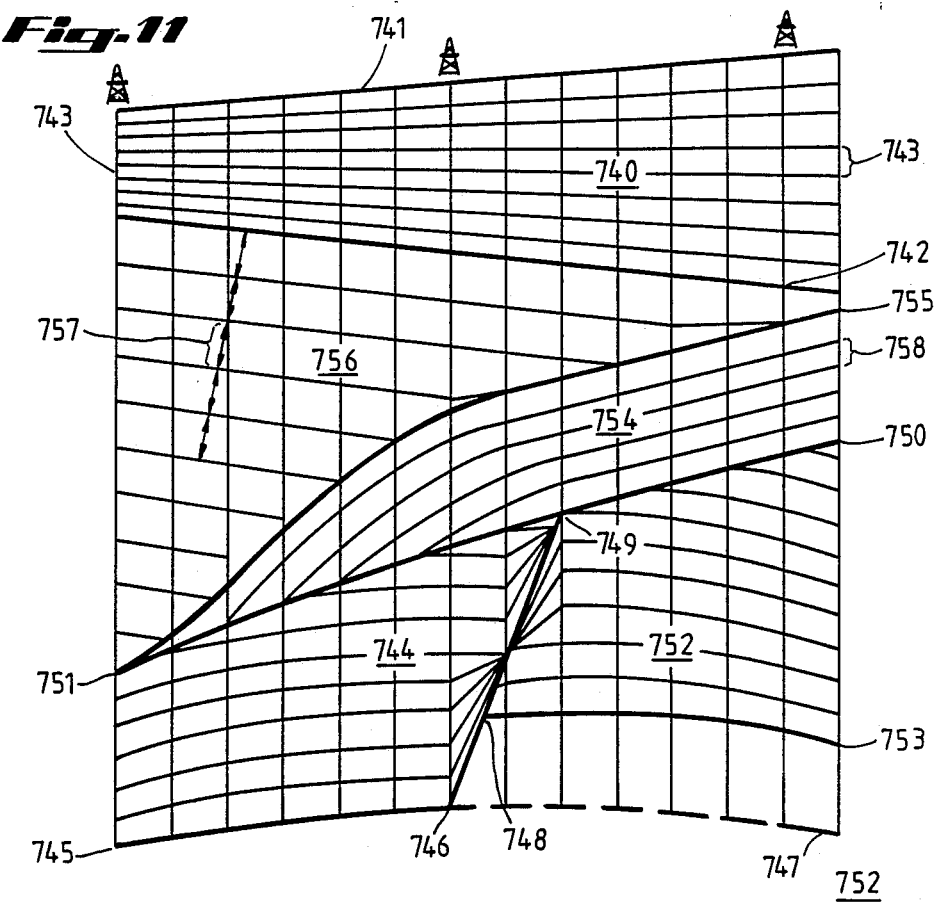
FIG. 11 illustrates cell placement by the process of the present invention within two blocks and three sequences.

As mentioned earlier, according to the process of the present invention, after dividing the gross volume into one or more sequences and/or blocks with the critical surfaces, the process places layers of cells within each sequence or block according to the pattern or combination of patterns that best represent the strata and stratigraphy of the sequence and/or blocks. The bounding surfaces separating the layers of cells are analogous to and essentially parallel to the depositional surfaces found within each sequence or block. FIG. 11 shows cell placement by the process of the present invention within two blocks and three sequences.

Cell placement in a block 744 is initiated along a partial phantom surface 745-746-747 and is limited by a surface 745-746-748-749-750 and a surface 751-749-750. The significance of a "phantom" surface will be explained later. The onlap and truncation oblique pattern illustrated in FIGS. 10a and 10c are used.

Cell placement in a block 752 is initiated along a surface 745-746-748-753 and is limited by the surface 751-749-750. The truncation pattern illustrated in FIG. 10c is used.

Cell placement in a sequence 754 is initiated along a surface 751-755 and is limited by the surface 751-749-750. The offlap oblique element illustrated in FIG. 10b is used.

Cell placement in a sequence 756 is initiated along the surface 742 and is limited by the surface 751-755. The onlap oblique element illustrated in FIG. 10a is used.

Cell placement in a sequence 740 is controlled by surfaces 741 and 742. The proportional thickening/thinning element or mode is used.

Varying cell thicknesses may be specified by the user for different sequences or blocks. For example, if the attributes and/or values in the sequence 756 were relatively homogenous or of little interest, a relatively large vertical cell dimension 757 could be specified by the user. On the other hand, if rocks were of more interest, or were very heterogeneous, a smaller vertical distance, such as distance 743 for the sequence 740 or distance 758 for the sequence 754, could be specified.

Phantom surfaces or partial phantom surfaces are surfaces that have either wholly or partially moved their relative position (as in faulting) or have been removed by erosion. They are used to properly trend and place cell layers so that the proper geometric relationship to the limiting surfaces is maintained. Such phantom surfaces are illustrated in FIG. 12. A surface 772-773 is a "moved position" surface representing where a phantom surface 770-771 once was before it moved upward as indicated by the arrow.

A surface 770-771-774 is a partial phantom surface used to correctly initiate cell placement of cell layers in block 775. A surface defined by points 772-776-777-778-779-780 is the limiting surface for block 775.

Surfaces defined by points 772-776-777-779-780 and by points 781-782-783-784 are both partial phantom surfaces used to control cell placement in all parts of sequence 785 including remaining segments 785a and 785c, and the missing segment 785b. A surface defined by points 781-782-777-778-779-783-784 is the geologically younger limiting surface that will allow removal of phantom segment 785b, and the partial phantom surface defined by the points 781-782-783-784 is the initiating surface for the sequence 785. The partial phantom surface defined by the points 772-776-777-779-780 is the geologically older limiting surface for the sequence 785.

Surfaces defined by the points 781-782-783-784 and by the points 786-787-788-789 are partial phantom surfaces used to control cell layer placement in a sequence 790 including both the remaining sequence segments 790a and 790c, and the missing sequence segment 790b. Segments defined by points 787-788, points 782-783, and points 777-779 are erosion phantom horizons.

STEP 6: The final step in model building is to introduce data, usually from wells or from seismic data, into the model, and then interpolate and extrapolate this data from and between data points to all cells throughout the model. Wells, core holes, or borings most often provide "strings" of data at data points. Data is coded by intervals and entered into the model as data "strings". Data may either be codes representing qualitative discrete attributes like sandstone or shale or may be numerical values like 2% porosity, 14% porosity, etc. The data is divided into intervals defined by depth below sea level. Then, codes representing discrete attributes or the numerical values are assigned to the intervals as shown below:

Discrete Attribute Data at Location x,y

-continued

| | Codes |
|---|---|
| −8030 to −8040 | 101 |
| −8040 to 8060 | 105 |
| −8060 to 8110 | 110 |
| −8110 to 8115 | 99 |
| −8115 to 8145 | 110 |

| Legend of Codes | |
|---|---|
| 99 = | coal |
| 101 = | sandstone |
| 105 = | limestone |
| 110 = | shale |

| Numerical Values Data at Location x,y | |
|---|---|
| | values |
| −2830 to −2833 | .28 |
| −2833 to −2835 | .21 |
| −2835 to −2840 | .15 |
| −2840 to −2841 | .30 |
| −2841 to −2843 | .22 |

A series or "string" of data intervals (separated by depths below sea level) are entered into the model at the data points. This data string is cut by both critical surfaces and surfaces bounding and defining cell layers. The point at which these surfaces cut the interval data string is recorded in feet below sea level. The majority of the discrete attributes or the average of numerical values between cell bounding surfaces is assigned to the proper cell layer (see FIG. 14). Those attributes or values are then interpolated between data points or extrapolated past data points. One of the important features of the invention is that data is extrapolated past and interpolated between data points within each unique cell layer. This lateral distribution of data along the individual cell layer is analogous to the manner in which rock characteristics vary along depositional surfaces.

Figure 13:
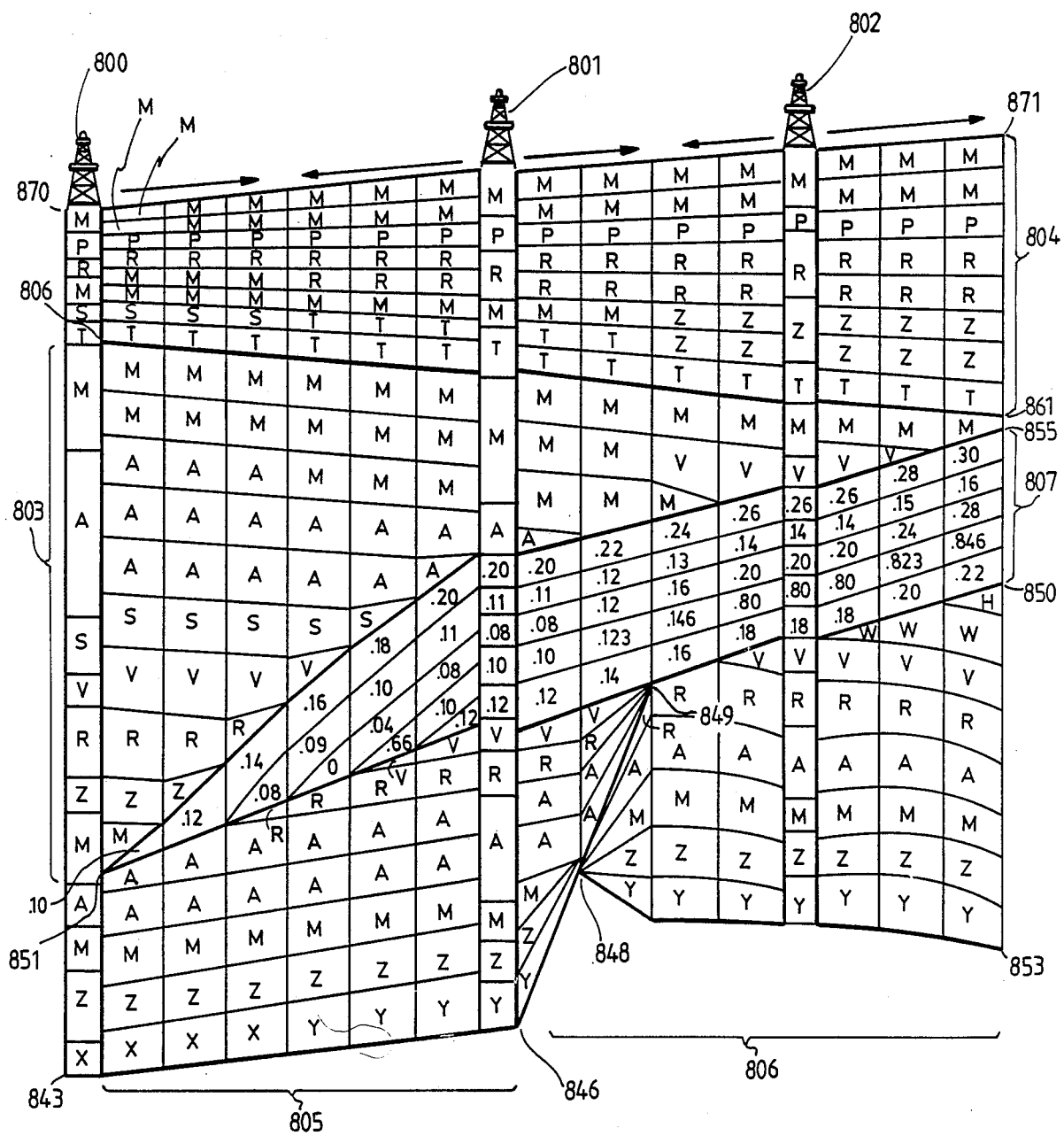
FIG. 13 illustrates how the process according to the present invention assigns discrete attributes and numerical values along each cell layer within each sequence or block.

FIG. 13 is a section illustrating how the process according to the present invention assigns discrete attributes (i.e., A,M,P,R,S,T,V,Y, and Z) and numerical values (0.18, 0.20, etc.) from vertical strings of data along each unique cell layer within each sequence or block. Wells 800, 801, and 802 provide vertical strings of data. The attributes and values are assigned along each unique and appropriate cell layer within each sequence or block (see FIG. 14). Discrete attributes have been assigned to the cells in sequences 803 and 804, and to the cells in blocks 805 and 806. Numerical values have been assigned to the cells in sequence 807. Critical surfaces 843-846-848-853; 843-846-848-849-850; 851-849-850; 851-855; 860-861; and 870-871 define the boundaries of the blocks and sequences.

Figure 14:
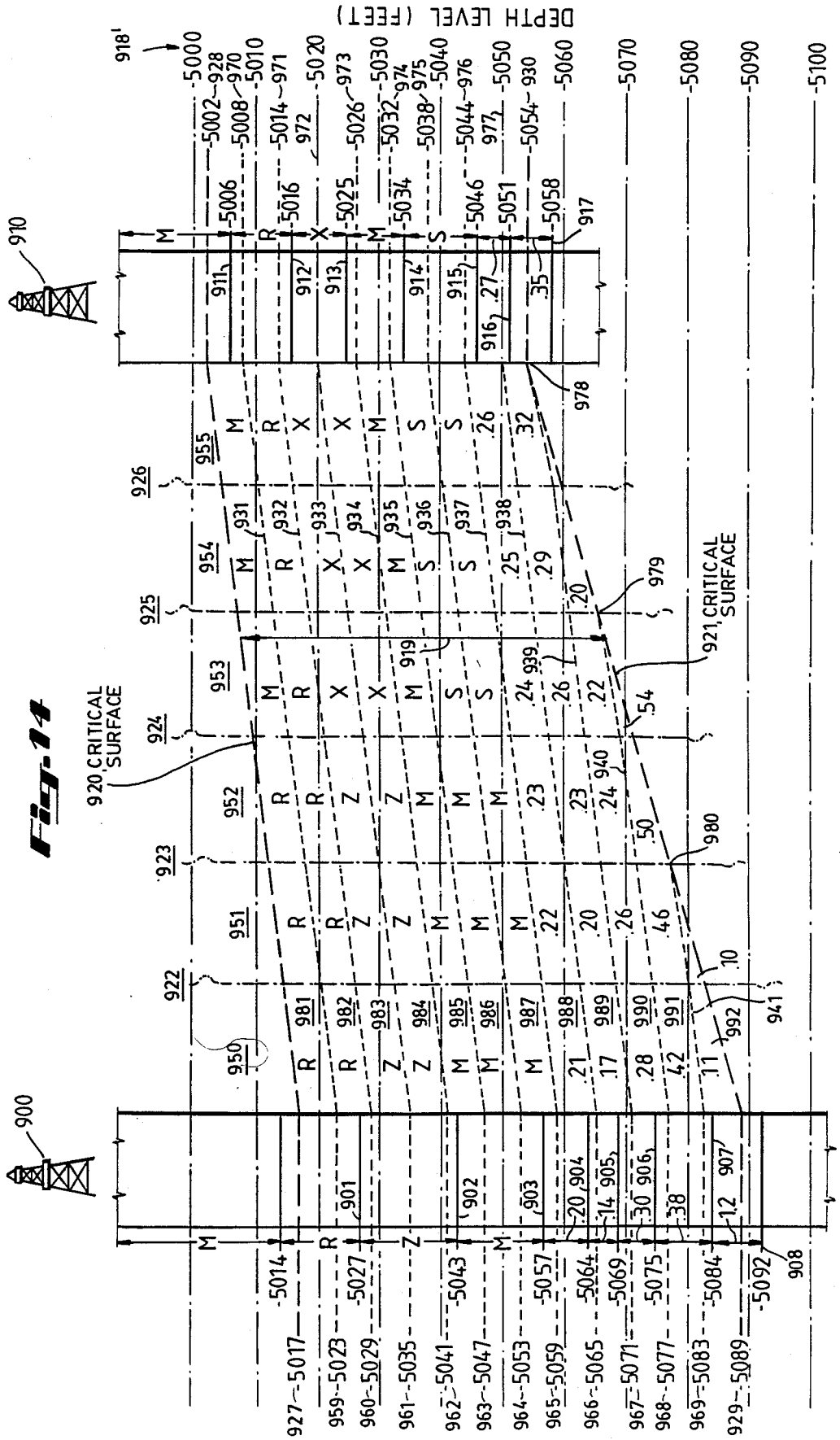
FIG. 14 illustrates how the process according to the present invention converts critical surfaces, cell bounding surfaces, and boundaries between differing well data to depth-below-sea-level and subsequently how they relate to one another in space. The method of interpolation and extrapolation of data from wells into the model built according to the process of the present invention is also shown.

FIG. 14 shows the relative depths below sea level of data interval boundaries, critical surfaces, and boundaries between cell layers. The method of assigning, interpolating, and extrapolating data is also illustrated.

Specific intervals in a well 900, designated M, R, Z, M, 0.20, 0.14, 0.30, 0.38, and 0.12, constitute varying intervals of that well which have their boundaries marked by depths below sea level 901, 902, 903, 904, 905, 906, 907, and 908, respectively. Similarly, a well 910 is composed of intervals varying in thickness, and designated M, R, X, M, S, 0.27, and 0.35. The boundaries of these intervals are marked by depths below sea level 911, 912, 913, 914, 915, 916, and 917. In the background of the illustration are horizontal lines representing ten foot increments of depth below sea level (see 918's). Two critical surfaces enclose the sequence 919. The upper critical surface is an initiating surface 920, while the lower critical surface is a limiting surface 921. The initiating surface 920 "cuts" the well 900 at a depth 927 (−5017) and the well 910 at a depth 928 (−5002). The limiting surface 921 "cuts" the well 900 at a depth 929 (−5089) and the well 910 at a depth 930 (−5054). Vertical lines 922, 923, 924, 925, and 926 divide the sequence into cell columns 950, 951, 952, 953, 954, and 955. Surfaces 931, 932, 933, 934, 935, 936, 937, 938, 939, 940, and 941 parallel the initiating or originating surface 920, and when combined with the grid lines 922, 923, 924, 925, and 926 divide the sequence into cells. The cells have a six-foot vertical dimension and are parallelapipeds except where their bounding surfaces 939, 940, and 941 encounter the limiting surface in which case the cells are rhomboids, trapezoids, and trianguloids. The surface 931 cuts the well 900 at a depth 959 (−5023) and the well 910 at a depth 970 (−5008), and when combined with the initiating or originating surface 920 define a cell layer 981. A surface 932 cuts the well 900 at a depth 960 (−5029) and the well 910 at a depth 971 (−5014), and when combined with the surface 931 define a cell layer 982. The surface 933 cuts the well 900 at a depth 961 (−5035) and the well 910 at a depth 972 (−5020), and when combined with the surface 932 define a cell layer 983. The surface 934 cuts the well 900 at a depth 962 (−5041) and the well 910 at a depth 973 (−5062), and when combined with the surface 933 define a cell layer 984. The surface 935 cuts the well 900 at a depth 963 (−5047) and the well 910 at a depth 974 (−5032), and when combined with the surface 934 define a cell layer 985. The surface 936 cuts the well 900 at a depth 964 (−5053) and the well 910 at a depth 975 (−5038), and when combined with the surface 935 define a cell layer 986. The surface 937 cuts the well 900 at a depth 965 (−5059) and the well 910 at a depth 976 (−5044), and when combined with the surface 936 define a cell layer 987. The surface 938 cuts the well 900 at a depth 966 (−5065) and the well 910 at a depth 977 (−5050), and when combined with the surface 937 define a cell layer 988. The surface 939 cuts the well 900 at a depth 967 (−5071) and reaches both the well 910 and the limiting surface 921 at a depth 978 (−5054). When combined with the surface 938, a cell layer 989 is defined. The surface 940 cuts the well 900 at a depth 968 (−5077) and terminates against the limiting surface 921 at a depth 979. When combined with the surface 939, a cell layer 990 is defined. The surface 941 cuts the well 900 at a depth 969 (−5083) and terminates against the limiting surface 921 at a depth 980. When combined with the surface 939, a cell layer 991 is defined. The limiting surface 921 cuts the well 900 at a depth 929 (−5089) and forms the base surface of the sequence. When combined with the surface 941, a cell layer 992 is defined.

Individual cells within cell layers are assigned (interpolated and/or extrapolated) discrete attributes (M, R, Z, etc.) and numerical values (0.17, 0.20, 0.23, etc.) based on what data in each well is "bracketed" by the two surfaces that define the particular cell layer. In the well 900, for example, the surfaces 931 and 932 define the cell layer 982 and cut the well 900 at a depth 959 (−5023) and at a depth 960 (−5029). The cell layer defined by the two surfaces overlays discrete attributes R and Z. These surfaces are separated by the horizon at a depth 901 (−5027). Since four feet (from the depth 959 to a depth 961 (−5027)) of the six-foot-thick cell (from the depth 959 to the depth 960) overlays attribute R, while only two feet (from the depth 901 (−5027) to the depth 960 (−5029)) overlays attribute Z, the attribute R is assigned to the cells within the cell layer 982 that are closest to the well 900, or to the cells in the columns 950, 951, and 952 (halfway to the well 910). The surfaces 931 and 932, which define the cell layer 982, cut the well 910 at the depth 970 and at the depth 971. Both levels lie within the limiting boundaries (the depths 911 and 912) of the attribute R and thus the cells in the columns 953, 954, and 955 (or halfway to the well 900) are designated R cells. The final result is that the attribute R is assigned completely across the cell layer 982, which is closely analogous to nature. The cell layer 986 is defined by the surfaces 935 and 936, and the layer 986 cuts the well 900 at the levels 963 and 964. Both the surfaces 935 and 936 cut the data string of the well 900 within the boundaries (depths 902 and 903) of the attribute M. The attribute M is therefore assigned to the cells of the cell layer 986 which are in the cell columns 950, 951, and 952 (or halfway to the well 910). The two surfaces 935 and 936 which define the cell layer 986 cut the well 910 at the depths 974 and 975. The cell layer 986 overlays four feet of the attribute S (bounded by depths 914 and 975) and only two feet of the attribute M (bounded by depths 974 and 914). The majority of the cell layer 986 in the well 910 is composed of the attribute S. Thus, the cells in the columns 953, 954, and 955 (halfway to the well 900) are designated as S cells. The cell layer 988 is defined by the surfaces 937 and 938 which cut the well 900 at the levels 965 and 966. The cell layer 988 overlays five feet of the value 0.20 (from the depth 965 to the depth 904) and one foot of the value 0.14 (from the depth 904 to the depth 966). Therefore, at the well 900, the value 0.20 is assigned to the cell layer 988. In a similar manner, in the well 910, the cell layer 988 is assigned the value 0.27. There are six cells lying between the well 900 and the well 910 in the cell layer 988. There exists a numerical difference of 0.07 in the attributes in the layer 988 between the two wells 900 and 910. The values increase by 0.01 units (0.07 divided by 7) per cell between the wells 900 and 910. Therefore, the cells in the cell layer 988 are assigned values as follows. The cell in the column 950 is assigned the value 0.21. The cell in the column 951 is assigned the value 0.22. Similarly, the value 0.23 is assigned in the column 952, 0.24 in the column 953, 0.25 in the column 954, and 0.26 in the column 955.

Some cell layers terminate against a limiting surface (e.g., the cell layers 990, 991, and 992) leaving no value on one end of the cell layer. In such cases, other wells in the area (away from the termination points 980, 979, and 978) are used in conjunction with the one well (i.e., the well 900) to calculate values for the cells. This method was used for the layers 990, 991, and 992.

All surfaces and cell layer boundaries normally extend to the x,y boundaries of the model. However, the invention also applies to surfaces and boundaries with "elevation missing" codes at various x,y coordinates.

THE PROCESS STEPS: DETAILED EXPLANATION

Building A Physical Coordinates Model

Referring now to Table 1 below, the definitions of the abbreviations used in the flowcharts of FIGS. 15 and 17–20 are given.

TABLE 1

DEFINITIONS:

| | |
|---|---|
| O = | Onlap |
| OF = | Offlap |
| P = | Proportional |
| T = | Truncation |
| ST = | Stratigraphic type |
| PCM = | Physical Coordinates Model |
| HORIZ(J,3) = | For each horizon "J", contains horizon name, "naive" (stratigraphically unrestricted) grid file name, and "limited" (stratigraphically restricted) grid file name |
| MAXINT(I) = | Maximum vertical (elevation) difference between younger and older horizon grids in a stratigraphic sequence number "I" |
| INTEGER = | [MAXINT(I)/Cell thickness] truncated to the next lowest integer |
| # LAYERS(I) = | a. if proportional sequence, # of vertical cells − 1 or  b. if truncation or onlap/offlap sequence, INTEGER-1 |
| CELLTH(I) = | a. if proportional sequence, MAXINT(I)/# of vertical cells in sequence "I" or  b. if truncation or onlap/offlap sequence, cell thickness in sequence number "I" |
| YGRID(X, Y) = | 2-D array containing "naive" younger horizon grid for stratigraphic sequence "I" |
| OGRID(X, Y) = | 2-D array containing "naive" older horizon grid for stratigraphic sequence "I" |
| YGRDL(X, Y) = | 2-D array containing "limited" younger horizon grid for stratigraphic sequence "I" |
| OGRIDL(X, Y) = | 2-D array containing "limited" older horizon grid for stratigraphic sequence "I" |
| ZINDEX = | Index of physical coordinates model "Z" coordinate layer |
| PCM(X, Y, Z) = | 3-D array containing elevations of attribute model cell vertices (physical coordinates model) |

Figure 15:
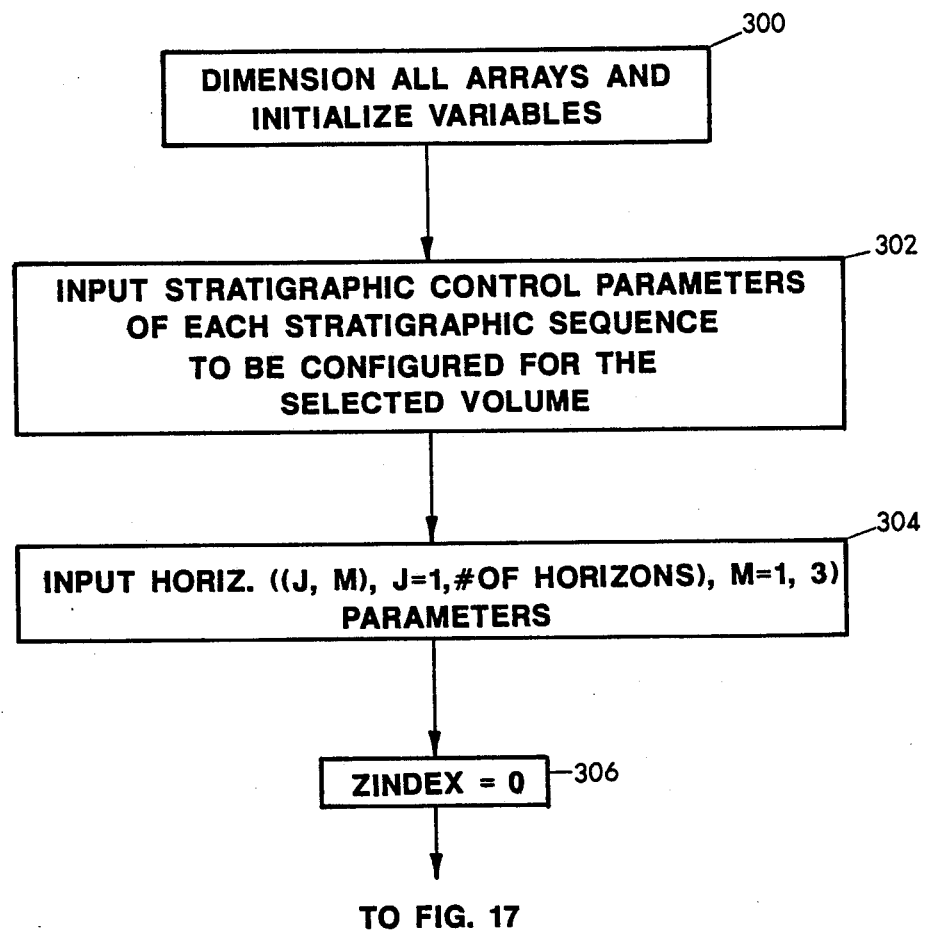
FIG. 15 is a flowchart of the beginning of the process of constructing a model according to the process of the present invention.

Referring now to FIG. 15, after all arrays are dimensioned and all variables are initialized (step 300), based on available geological information, the user inputs the appropriate pattern for each sequence into the computer (step 302). Then, for each critical surface, the name of the surface, and the names of the files that will contain data representing those surfaces are assigned (step 304). Finally, the counter for the number of layers in a given sequence is initialized at zero (step 306). This counter is named "ZINDEX".

Figure 16A:
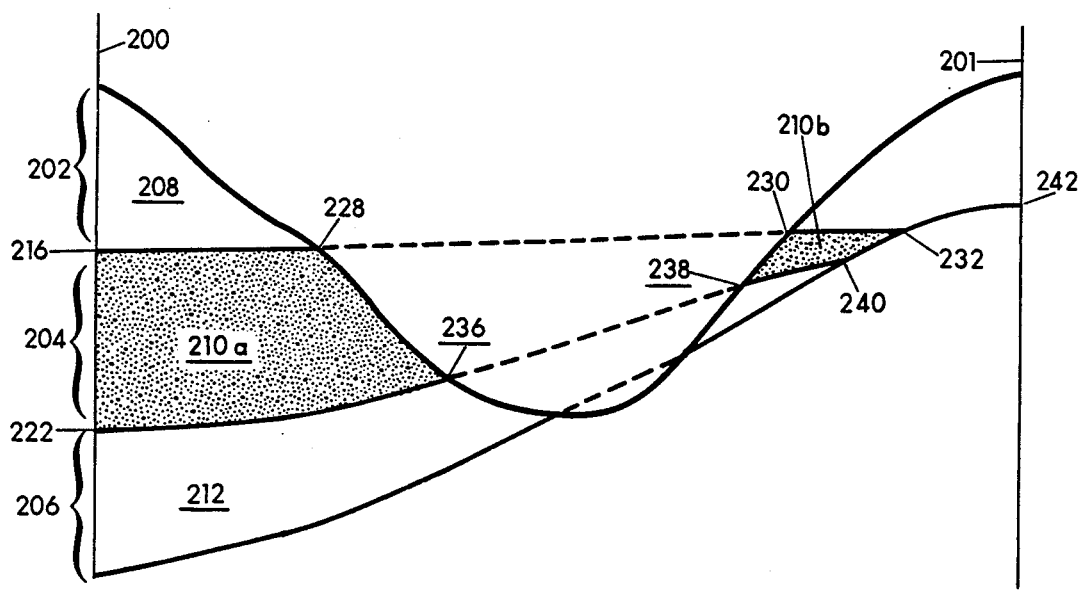
FIG. 16a illustrates a cross-sectional view of three different geologic sequences and the use of naive or phantom surfaces.
Figure 16B:
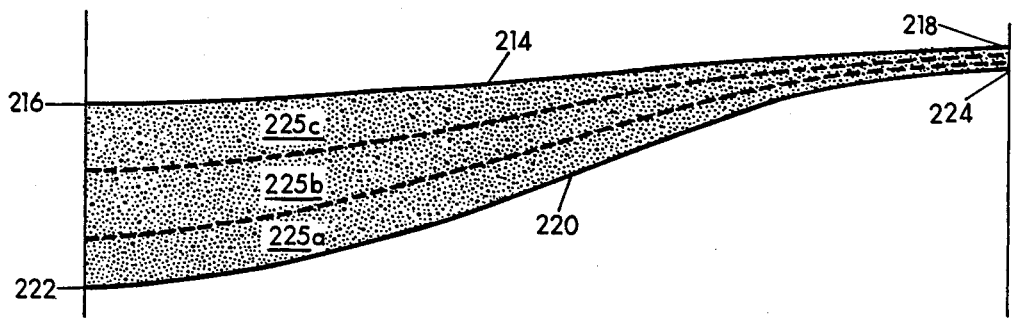
Figure 16C:
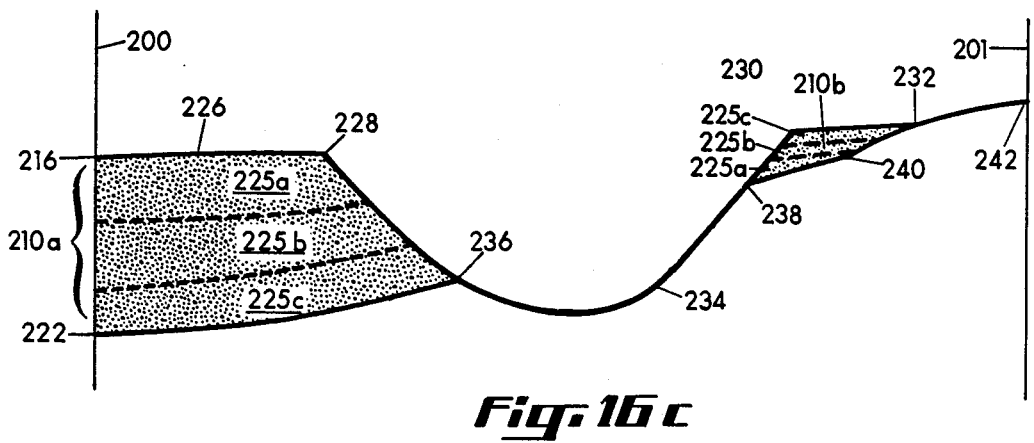

Referring now to FIG. 16a, assume, as an example, that the sequence of interest is the proportional sequence 210a and 210b. As step 308 of FIG. 17, the commercial data representing a critical surface 214 (see FIG. 16b) is transferred into a two-dimensional array and labeled "YGRID". The critical surface 214 is represented in FIG. 16b by a line from a point 216 to a point 218. The critical surface 214 is "younger" in geologic time than a lower elevation critical surface 220. At step 310 of FIG. 17, the data representing the older critical surface 220 is transferred into a two-dimensional array and labeled "OGRID". The critical surface 220 is represented in FIG. 16b by a line from a point 222 to a point 224. As noted in steps 308 and 310 of FIG. 17 and as noted in Table 1, the data representing critical surfaces 214 and 220 is "naive" data. The data is "naive" because not all of the composite parts of the surfaces 214 and 220 may actually exist in the volume being modeled. That is, no attempt is made to limit the grid numerical approximation algorithm from extrapolating to elevation values that would project the geological surface above or below another geological surface or horizon within the same stratigraphic framework. However, referring now to FIGS. 16b and 16c, naive surfaces 214 and 220 are needed in order to construct layers of cells 225a, 225b, and 225c, as will be explained later.

Referring now to FIG. 16c, a younger critical surface 226 for the proportional sequence 210a and 210b represents an artificial composite younger critical surface existing underground in the geologic volume of interest. The critical surface 226 is defined by points 216, 228, 236, 238, 230, 232, and 242.

The critical surface 226 is referred to as a "limited" surface, since the construction of cells in the model layers 225a, 225b, and 225c is limited by the surface 226. That is, cells having risers of non-zero length cannot extend continuously from sequence area 210a to sequence area 210b. As step 312 of FIG. 17, data representing surface 226 is transferred from a storage device into a two-dimensional array labeled "YGRDL". The data or "grid file" to represent surface 226, or any other "limited" critical surface, is generated by mathematically comparing two "naive" grids and outputting a third grid which has been restricted by the upper or lower bounds of one of the input grids. For instance, if the upper horizon grid is presumed to represent an unconformity (a truncating geological time line caused by erosion or weathering), then any lower (older) horizon grid is mathematically limited in surface elevation so that, at any particular x,y geographical coordinate, the elevation of the older horizon grid is not allowed to project above the elevation of the upper horizon grid at that particular x,y coordinate. If the "naive" lower horizon grid elevation is geographically higher than the upper horizon grid, then the grid operation makes the elevation value of the "limited" grid equal to that of the upper grid at that particular x,y coordinate.

The process of this invention is not limited to using only "naive" and "limited" grids to represent critical surfaces. For complex stratigraphy, a third grid which is a combination of a naive grid and a limited grid may be used.

Referring now to FIG. 16c, an older critical surface 234 for the proportional sequence 210a and 210b represents the actual older critical surface existing underground in the geologic volume of interest. The critical surface 234 is defined by points 222, 236, 238, 240, 232, and 242.

Figure 17:
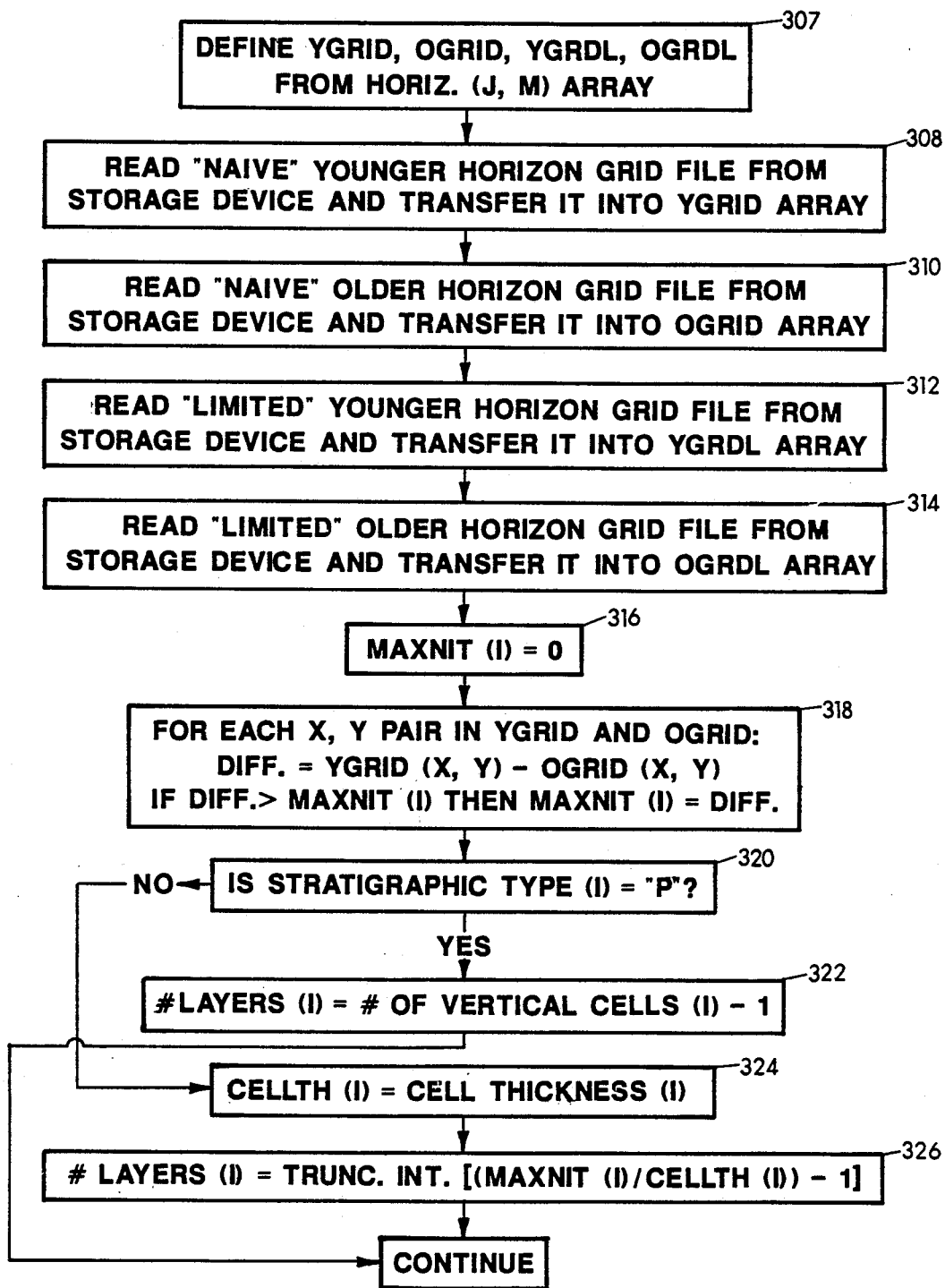
FIG. 17 is a flow diagram of part of the process of the present invention illustrating the calculation of certain variables used in the construction of the three-dimensional model.

Referring now to FIG. 17, as step 314 the data or "grid" representing the critical surface 234 is transferred from a storage device into a two-dimensional array labeled "OGRDL". As step 316, a variable "MAXINT" which represents the maximum vertical (elevation) difference between younger and older horizon grids in a stratigraphic sequence is set equal to zero. Referring now to FIGS. 16a 16b and 16c, and assuming that vertical lines 200 and 201 define arbitrarily chosen boundaries of the sequences 208, 210, and 212, the maximum vertical difference between the younger horizon grid 214 (FIG. 16b) and the older horizon grid 220 (FIG. 16b) is a distance 204 (FIG. 16a). Similarly, MAXINT for a truncation sequence 208 is a distance 202, and for an onlap sequence 212 is a distance 206. As step 318 of FIG. 17, for each pair of x,y coordinates in the YGRID and OGRID arrays, the variable MAXINT(I) is compared to the difference between the YGRID and the OGRID arrays. If the difference between the two grids at a particular x,y coordinate pair is greater than MAXINT(I), then MAXINT(I) is redefined to be that difference. For this example, referring now to FIG. 16b, since on the left side of the section the younger horizon 214 is at the greatest vertical distance from horizon 220, the variable MAXINT(I) will be equal to the maximum difference (distance 204) in elevation between those two horizons.

Referring now to steps 320-326 of FIG. 17, if in step 302, a proportional pattern were input, then based on the decision of step 320, at step 322, the number of layers in the sequence of interest is set equal to one less than an arbitrary number of vertical cells selected by the earth scientist. That is, the earth scientist may choose to divide the sequence 210 in FIG. 16c into only three layers of cells, shown in FIG. 16c as 225a, 225b, and 225c, or the earth scientist may choose to divide the sequence 210 into ten layers of cells. If, in step 302, a proportional pattern were input, then as step 324 the variable CELLTH(I) is set equal to whatever vertical cell thickness the earth scientist chooses to have for the particular sequence in question. As step 326, the variable #LAYERS(I) is set equal to one less than the truncated integer of the quotient formed by dividing the variable MAXINT(I) by the variable CELLTH(I).

Figure 18:
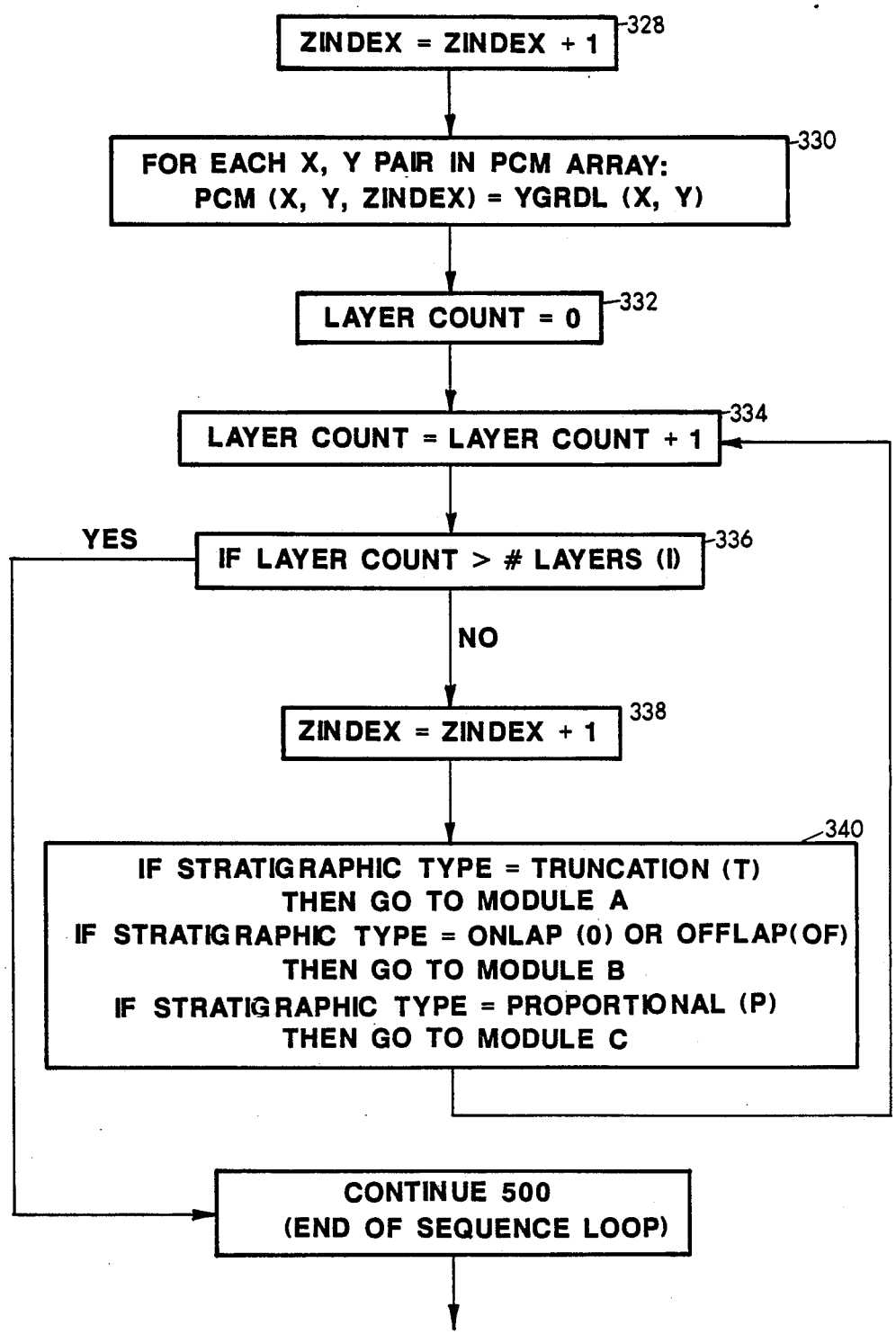
FIG. 18 is a flow diagram of part of the process of the present invention illustrating in part the construction of the first row of cells in each geological sequence of the model of the present invention.

Referring now to FIG. 18, in step 328 the cell layer counter variable ZINDEX is incremented by one. Then, in step 330, for each pair of x,y coordinates in the PCM array, the elevation of the top of the riser for each trio of coordinates x,y, and ZINDEX in the three-dimensional array PCM(X,Y,ZINDEX) is set equal to the value of the elevation for each corresponding pair of coordinates in the two-dimensional grid file representing the limited younger horizon. In step 332, the variable "LAYER COUNT" is initialized at zero. Steps 334-340 form a loop. As the first step of the loop, in step 334 the variable LAYER COUNT is incremented by one. If after that incrementation, the variable LAYER COUNT is greater than the variable #LAYERS(I), then no further layers of cells are constructed (step 336) and the program branches to step 500 (end of geological sequence loop). If there is another sequence, the program returns to step 307. If not, then the variable ZINDEX, being the third dimension of the three-dimensional PCM array, is incremented by one. At step 340, depending on the pattern input in step 302, the program branches to one of three subroutines labeled Module A (FIG. 20), Module B (FIG. 21), and Module C (FIG. 22). After completion of the subroutine Module A, B, or C, the program branches to step 334 to increment the layer count.

Figure 19:
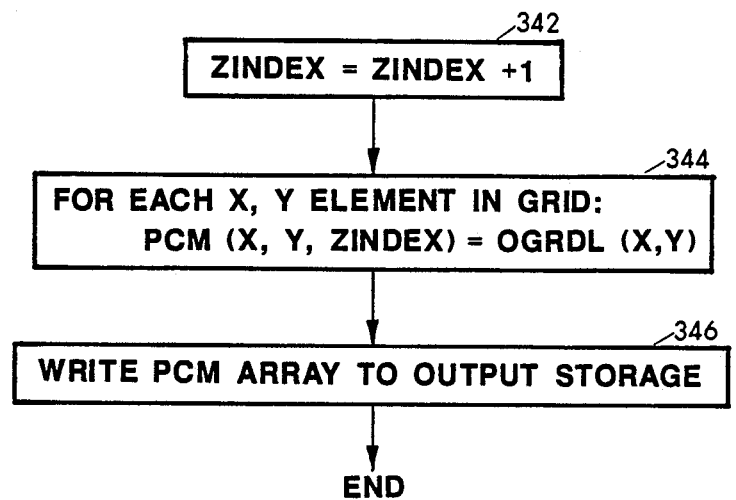
FIG. 19 is a flow diagram of part of the process of the present invention illustrating the construction of the last row of cells of the three-dimensional model.

Referring now to FIG. 19, when all sequences are processed (loop 307 to 500), the variable ZINDEX is incremented by one (step 342). Then, for that value of ZINDEX, the elevation of the bottom of the riser for the last layer of cells at each trio of coordinates x,y, and ZINDEX in the PCM array is set equal to the value of the elevation for each pair of corresponding x,y coordinates of the OGRDL array of the oldest sequence. Step 344 completes the formation of the three-dimensional PCM array with the associated riser elevation values, and thus as step 346 the PCM array is written to output storage.

Figure 20:
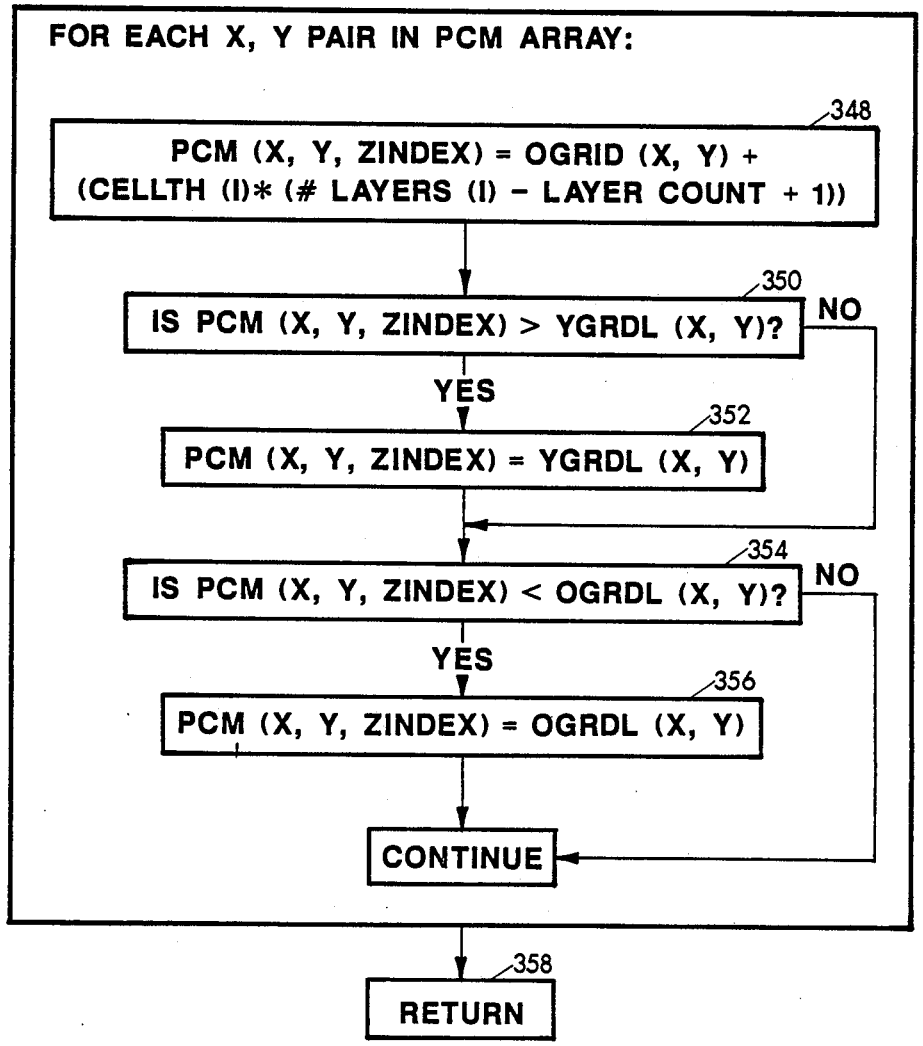
FIG. 20 is a flow diagram of part of the process of the present invention illustrating the construction of rows of cells, for a truncation sequence.

Referring now to FIG. 20, the process for constructing a single layer of cells for a truncation sequence is illustrated. It is commonly believed that, except for catastrophes such as upheavals in the earth, the deepest layers of the earth were laid down first in time. However, for programming efficiency, the process of the present invention constructs a model of a given geologic sequence beginning with the youngest layers. The model geometry would be the same if constructed bottom to top. Since in a truncation sequence, the layers parallel the oldest critical surface, in step 348 the elevation of the top of the riser for each trio of x,y, and ZINDEX coordinates is calculated by multiplying the variable CELLTH(I) times the sum of [1 plus the variable #LAYERS(I) minus the variable LAYER COUNT]. This product is then algebraically added to the elevation value associated with the same x,y coordinates in the OGRID array. Since subsurface elevations below sea level are more negative with greater depth, this places the elevation of the calculated layer above the OGRID horizon. The layer of cells thus constructed is parallel to the naive older critical surface represented by the OGRID array.

In step 350, the elevation of the top of the riser for each trio of coordinates x,y, and ZINDEX in the three-dimensional PCM array is compared with the elevation for each pair of corresponding x,y coordinates in the two-dimensional YGRDL array. As noted earlier, the YGRLD array represents the actual younger critical surface of the sequence in question. For the proportional sequence 210a, 210b, the YGRDL array represents the critical surface 226 of FIG. 16c. If the elevation value assigned to the PCM array for a given trio of x,y, and ZINDEX coordinates is greater than the corresponding elevation for the YGRDL array for the same x,y coordinates, then the YGRDL elevation value is substituted for the elevation value in the PCM array (step 352). The elevation of the bottom of the riser for the same trio of x,y coordinates is then checked against the elevation for the same two x,y coordinates in the OGRDL array (step 354). For the sequence 210a, 210b of FIG. 16c, the OGRDL array represents the critical surface 234.

If the value of the elevation of the bottom of the riser of the PCM array is less than the corresponding elevation of the OGRDL array, then the elevation value for the pair of x,y coordinates of the OGRDL array is substituted for the value of the elevation of the bottom of the riser for the same two x,y coordinates in the PCM array (step 356). The process then begins anew at step 348 for a different pair of x,y coordinates until a riser elevation value has been assigned to every trio of x,y, and ZINDEX coordinates in the PCM array for this layer. The resultant layers for a given stratigraphic sequence include the upper and lower critical surfaces as boundaries. The lower boundary is the upper boundary for the next older sequence. Then, at step 358, the process returns to step 334 in the main program (FIG. 18).

Figure 21:
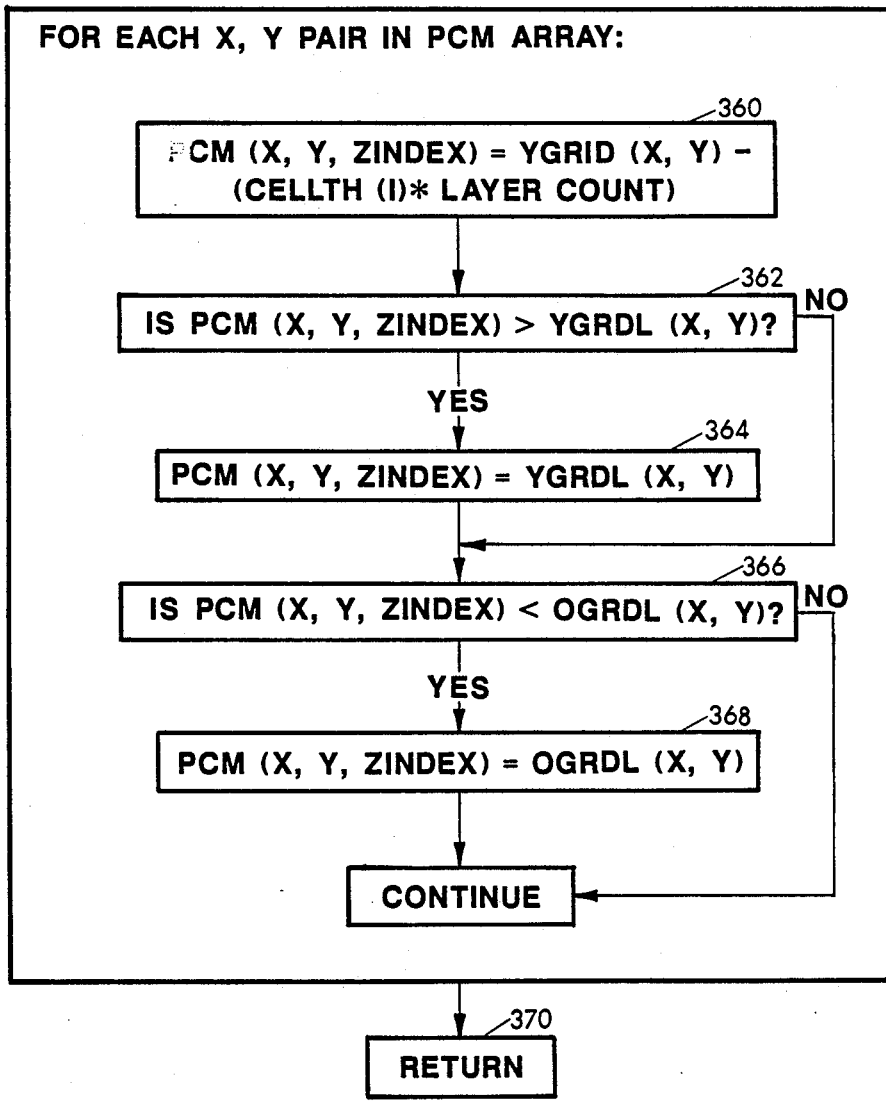
FIG. 21 is a flow diagram of part of the process of the present invention illustrating the construction of rows of cells for a onlap/offlap sequence.
Figure 22:
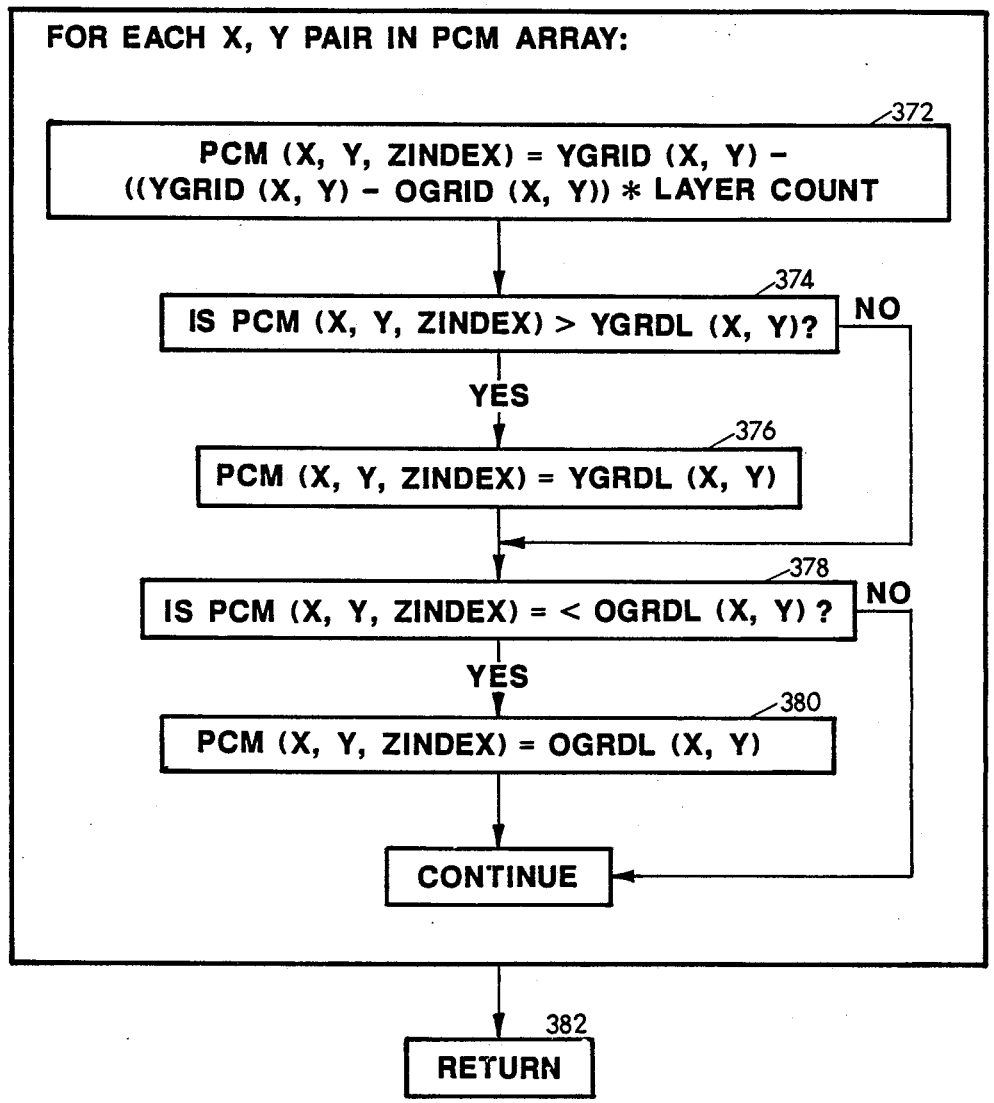
FIG. 22 is a flow diagram of part of the process of the present invention illustrating the construction of rows of cells for a proportional sequence.

Referring now to FIG. 21, the steps of the process for constructing a layer of cells for either an onlap or an offlap sequence is illustrated. The process of the present invention constructs the model for an onlap or an offlap sequence by building the layers of cells beginning with the younger horizon and working downward to the lower elevation of the older horizon. In step 360, for a given trio of x,y, and ZINDEX coordinates in the PCM array, the elevation of the top of the riser is assigned the value of the elevation of the YGRID array for the same x,y coordinates, minus the product of the two variables CELLTH(I) and LAYER COUNT. The layer of cells thus constructed is below and parallel to the naive younger critical surface represented by the YGRID array. In step 362, the elevation of the top of the riser for the same trio of coordinates in the PCM array is compared with the elevation for the same pair of x,y coordinates in the array representing the actual younger horizon. If the value of the elevation of the top of the riser is greater (more positive or less negative) than the elevation value in the YGRDL array, then the elevation value of the YGRDL array is substituted for the value of the elevation in the PCM array (step 364).

The elevation of the bottom of the riser for the same trio of coordinates in the PCM array is then compared with the elevation value for the same x,y coordinates in the array representing the older limiting horizon, the OGRDL array. If the value of the elevation of the bottom of the riser for the same trio of coordinates in the PCM array is less than the elevation value of the OGRDL array for the corresponding x,y coordinates (step 366), then the elevation of the bottom of the riser in the PCM array assumes the value of the elevation of the OGRDL array for those x,y coordinates (step 368). The process then begins again at step 360 for a different pair of x,y coordinates, until every pair of x,y coordinates in the YGRID array has been accounted for. Thus, the YGRDL and OGRDL elevation values form the upper and lower boundaries for constructing the layers of cells in the sequence. Then at step 370, the process returns to step 334 in the main program (FIG. 18).

Referring now to FIG. 22, "Module C", being the subroutine for modeling geologic sequences when the layers thicken and thin, is illustrated. In step 372, for each set of x,y, and ZINDEX coordinates in the PCM array, the elevation value of the top of the riser assumes the value of the elevation value for the same x,y coordinates of the YGRID array minus the product of the LAYER COUNT variable and the difference between the elevation values of the YGRID and OGRID arrays at each x,y location. The cells thus constructed are proportionally vertically spaced between the "naive" younger YGRID and older OGRID arrays. If the value of the elevation of the top of the riser for the same trio of coordinates in the PCM array is greater than the elevation value for the corresponding x,y coordinates in the YGRDL array (step 374), then the top of the riser assumes the value of the YGRDL elevation (step 376).

If the elevation of the bottom of the riser for the same trio of coordinates in the PCM array is less than the elevation value for the corresponding x,y coordinates in the OGRDL array (step 378), then the elevation of the bottom of the riser assumes the value of the elevation value of the OGRDL array (step 380). For each pair of x,y coordinates in the YGRID array, the process begins again at step 372. Thus, the YGRDL and OGRDL elevation values form the upper and lower boundaries for constructing the layers of cells in the sequence. When all the x,y coordinates of the YGRID array have been accounted for, the process returns to step 334 in the main program (FIG. 18).

After the entire PCM array has elevation values assigned, various attributes such as porosity, permeability, etc. may be assigned to cells in the Attribute Model which correspond to sets (8 cell corners) of x,y, and z coordinates in the physical coordinate model. According to the process of the present invention, if there were only one well intersecting sequence 210, attributes known to exist in layer 225a of sequence 210a are assumed to also exist in layer 225a of sequence 210b, in greater or lesser amounts. Thus, depending upon the distance from the well supplying data for the layer 225a, for example, for each set of x,y, and ZINDEX coordinates representing a cell in layer 225a, attributes are assigned to the cells defined by those coordinates. Similarly, attributes are assigned to every cell in each of the layers 225b and 225c.

The attribute model of the invention containing numerous discrete attributes (e.g., lithology type) and numeric values (e.g., porosity %) is related to the physical coordinate model of the invention by the indices of the arrays they are in. For example in ATTRIBUTE ARRAY (x, y, z, A#)

x = index (1 to x limit)
y = index (1 to y limit)
z = index (1 to z limit)
A = index of Attribute types for Cell (x, y, z)
ATTRIBUTE ARRAY ((1,1,1,A#), A# = 1, #) contains the Attribute Values for Cell (1,1,1) which is defined as the volume bounded by the x,y and elevation coordinates defined by the Physical Coordinates Model Elements:

PCM (1,1,1)
PCM (1,2,1)
PCM (2,1,1)
PCM (2,2,1)
PCM (1,1,2)
PCM (1,2,2)
PCM (2,1,2)
PCM (2,2,2)

where:
x coordinate = x origin + ((grid interval * x index) − 1)
y coordinate = y origin + ((grid interval * y index) − 1)
z coordinate = PCM (x,y,z) elevation Building A Well Data File The input of geological attribute or value data to the invention is in the form of digitized, vertically oriented strings of data organized as numerous intervals, at specified x and y geographical coordinates, defined by interval top and base elevations with associated attributes and/or values within those intervals.

In order to interpolate geological attributes or numerical values throughout a model according to the present invention, it is first necessary to construct a "well data file". The well data file consists of a series of vertical elevation intervals, which correspond to the physical coordinate model cell layers that the well intervals pass through, together with associated geological attributes (or values), for each well or x,y coordinate data string to be used in supplying data for the model by interpolations and extrapolations. For each well represented in the well data file, there is one interval defined for each cell layer in the physical coordinates model through which the well passes. The format of the well data file, for each well represented, is a well header record, and a series of interval records containing a layer number corresponding to the z index in the physical coordinates model array, an interval top elevation, an interval base elevation, and one or more attributes and/or values associated with the interval depth.

The first step in constructing the well data file is to read from an input unit a well file containing first, a well header record which defines the beginning of a new series of vertical intervals for a unique x,y coordinate location. The well header record consists of a well identification name or number, the geographical x and y coordinates of the well location, and other well specification data. This is followed by a series of elevation interval data records consisting of the interval top, base and attribute code, or numerical value, for the interval.

The well header record is written to an output unit as part of the well data file. Then, the physical coordinates model array (PCM) is referenced and the x and y coordinates of the current well are used to calculate the set of four x and y indices of the PCM which define the cell column corners of the cell column which is intersected by the current well. That is, the x and y well coordinates fall within the square defined by the set of four x and y coordinates defining one cell column within the physical coordinates model array. These x,y indices are used to locate the surrounding cell corner elevations for each cell layer that the well data intervals intersect.

After locating the indices of the cell column within the PCM, the process according to the present invention loops through the z index (layers) of the PCM to find the four elevation values of each cell layer for this particular cell column. For each cell layer, the four elevations are used to compute a linear interpolation of the elevation at the current x,y well coordinates within the cell column. This process is used to compute the top and base elevations for each cell layer the current well data intervals penetrate. As each cell layer interval is defined by a top and base elevation at the x,y well coordinates, the top and base elevations are written to the output unit.

The well data interval or intervals corresponding to the cell layer interval are referenced to calculate the attribute code or numerical value to be associated with the interval written to the well data file. If calculating a discrete attribute, like lithology type, then the most abundant code within the interval is selected as the associated attribute code for the interval. If calculating a value, like porosity percent, then the averaged value within the interval range between the top and base elevations is used as the associated value for the interval and written to the well data file. This process continues until all attribute data in well data intervals have been read and reformatted into the cell layer interval format.

Upon completion of a series of well intervals within a single well, the next well, beginning with a well header record, is processed until all well data has been reformatted into the well data file format.

When completed, the well data file contains the most appropriate geological attribute or value for each interval corresponding to the cell layers in the physical coordinate model array.

Building An Attribute Model Array

According to the process of the present invention, an attribute model array is constructed separate from the physical coordinates array and the well data file. The attribute model array is used to store the interpolated attribute codes or numerical values which correspond to the subvolumes defined by the cell corners in the physical coordinates model array. Each record in the attribute model array represents a single cell and may contain one or more attributes and/or values.

The attribute model array also is used to store the volume calculations for each cell represented in the model. The volume of each cell is determined by the grid interval (cell width) squared times the average of the four vertical risers of the cell. These dimensions are found in the physical attribute model.

The interpolation process begins by looping through each x index of the attribute array from the first to the last.

Within the above loop, another loop is defined through each y index of the attribute array from the first to the last.

For each cell referenced by its unique x,y, and z index within the attribute array by the above loops, the following process is performed:

"Neighboring wells" in the well data file that penetrate the cell layer of the cell being interpolated are located. (Numerous algorithms exist to do this which may include directional bias, a sector search, a maximum search limit, etc.).

If a discrete attribute code is being interpolated or extrapolated, then the "closest" well (x,y coordinate location) is used to define the code to be stored in the current cell or attribute array address. The code found in that well's interval corresponding to the cell layer (same z index) of the current cell is stored in the attribute model cell location. The definition of "closest" well may be influenced by a directional biasing algorithm.

If a continuously variable value is being interpolated or extrapolated, then a distance weighting algorithm is employed to compute a weighted average value to be stored in the current cell at the attribute array address. The values to be averaged are located in the "neighboring well's" interval corresponding to the cell layer (same z index) of the current cell.

If the volume of the cell in the attribute model array has a value of zero (due to terminating cells with all four risers having values of zero), then at the user's discretion the interpolation process can be skipped for that cell.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A process for modeling a geologic volume bounded by critical surfaces, the volume having a given geologic stratigraphic pattern, other than a volume having depositional layers parallel to mean sea level, the process comprising the steps of:
   a. constructing a separate grid for each critical surface bounding said volume; and
   b. constructing layers of cells within said volume according to said pattern.

2. A process for modeling a stratigraphic geologic subvolume including an inclined initiating surface, a limiting surface and layers of sediments spanning an interval of geologic time occupying the space between said surfaces, which comprises:
   dividing said space into a plurality of laterally disposed, laterally aligned and vertically spaced grids of elemental cells, each cell having a reference point at each of its corners, the reference points in each said grid positioned to be along a grid layer of sediments of the same geologic time and to be equally spaced horizontally from each laterally adjacent reference point in said grid;
   vertically spacing said grids such that each said reference point in a vertical column of reference points is equidistant from each next adjacent reference point in said column;
   assigning representative x, y, z coordinates to each said reference point such that each elemental cell in said space may be identified by the sets of said coordinates at its respective corners; and
   reproducibly recording said sets of coordinates in digital form.

3. The method of claim 2 in which a characteristic of a given said elemental cell is stored in digital form in association with a set of said coordinates for said given cell.

4. The method of claim 3 further comprising the step of reproducing said characteristic and visually displaying said reproduced characteristic.

5. The method of claim 2 in which said subvolume is an onlap sequence, or an offlap sequence, or a truncation sequence, and all of said reference points in any given laterally disposed layer are equidistant from their vertically corresponding reference points in vertically adjacent said grids.

6. A process for modeling a geologic subvolume including an inclined originating surface, a limiting surface, and layers of sediments spanning an interval of geologic time occupying the space between said surfaces, which comprises:
   (1) dividing said space into a plurality of cells by
      (a) constructing a grid for said originating surface;
      (b) constructing layers of laterally disposed cells from said grid, the cells in successive said layers aligned in vertical columns;
   (2) assigning a set of coordinates to each said cell, whereby each said cell may be identified by its respective coordinates;
   (3) reproducibly and systematically recording said sets of coordinates; and
   (4) reproducibly recording a characteristic of a given cell in association with the coordinates of said given cell.

7. The method of claim 6 in which said characteristic is vertical distance from a datum level.

8. The method of claim 7 in which said vertical distance is recorded for each said set of reference coordinates, and which includes the steps of reproducing in visual map form all of said points whose sets of coordinates lie at a selected vertical distance from said datum level.

9. The method of claim 6 which includes reproducing in visual section form all of said points whose sets of coordinates lie in a common vertical plane passed through said space.

10. A process for modeling a bounded geologic volume, other than a volume having depositional layers parallel to mean sea level, having a given geologic stratigraphic pattern and a given initiating critical surface, comprising the steps of:
   (a) constructing a separate grid for each critical surface bounding said volume; and
   (b) constructing layers of cells between said grids and substantially parallel to said given initiating critical surface.

11. The process of claim 10 in which said given initiating critical surface is a naive surface.

12. A method using a stored program processor to model a geologic volume bounded by critical surfaces including an initiating critical surface, at least one limiting critical surface, and a stratigraphic pattern which includes inclined depositional layers, comprising the steps of:
   a. constructing naive initiating and limiting grids to represent the initiating and each limiting critical surface of the geologic volume, said grids defining a space representative of said volume; and
   b. constructing layers of cells within said space using one of said grids as a boundary for a first layer and in a configuration corresponding to said stratigraphic pattern.

13. A method using a stored program processor to model a geologic volume bounded by an initiating critical surface and a limiting critical surface with inclined depositional layers interposed between the two critical surfaces in a given stratigraphic pattern, comprising:
   a. constructing an initiating grid to represent the initiating surface;
   b. constructing a limiting grid to represent the limiting surface; and
   c. constructing layers of cells between the initiating grid and the limiting grid in accordance with the given stratigraphic pattern with the cells arranged in vertical columns from layer to layer.

14. A method using a stored program processor of modeling a geologic volume having depositional layers in a given stratigraphic pattern which includes layers other than horizontal which are bounded by an initiating surface and a limiting surface, comprising the steps of:
   a. constructing a first grid representative of the initiating surface and a second grid representative of the limiting surface;
   b. constructing spaced grids intermediate the first and second grids representative of depositional layering in accord with the given stratigraphic pattern;
   c. filling the space between the grids with cells arranged in vertical columns with adjacent cells in each column separated by one of said grids; and
   d. assigning coordinates to each said cell.

15. The method of claim 14, including the step of systematically and retrievably storing the cell coordinates.

16. The method of claim 15, including the step of retrievably storing an observation obtained at a given position within the geologic volume according to the cell coordinates of the cell corresponding to the given position within the geologic volume.

* * * * *

UNITED STATES PATENT AND TRADEMARK OFFICE
CERTIFICATE OF CORRECTION

PATENT NO. : B1  4,821,164
DATED      : January 23, 1996
INVENTOR(S) : DONALD C. SWANSON It is certified that error appears in the above-identified patent and that said Letters Patent is hereby corrected as shown below:

In column 2, lines 3 and 4, delete "points is equidistant from each next adjacent", Signed and Sealed this Twenty-eighth Day of October, 1997

Attest:

BRUCE LEHMAN

Attesting Officer

Commissioner of Patents and Trademarks

REEXAMINATION CERTIFICATE (2781th)
United States Patent [19]
Swanson

[11] B1 4,821,164
[45] Certificate Issued  Jan. 23, 1996

[54] PROCESS FOR THREE-DIMENSIONAL MATHEMATICAL MODELING OF UNDERGROUND GEOLOGIC VOLUMES

[75] Inventor: Donald C. Swanson, Houston, Tex.

[73] Assignee: Stratamodel, Inc., Houston, Tex.

Reexamination Request:
No. 90/003,813, May 2, 1995

Reexamination Certificate for:
Patent No.: 4,821,164
Issued: Apr. 11, 1989
Appl. No.: 890,467
Filed: Jul. 25, 1986

[51] Int. Cl.$^6$ .................................................. G01V 1/00
[52] U.S. Cl. ........................... 364/420; 364/578; 367/69; 2/919
[58] Field of Search ................................... 364/420, 421, 364/422, 578; 367/69, 72, 73

[56] References Cited

PUBLICATIONS

Eclipse Newsletter No. 3, 1984, "Fully Implicit Reservoir Simulator" by Exploration Consultants Limited.

Erdal Yildirim: Paper Presented to the Alberta Oil Sands Technology Authority–Advances in Petroleum Recovery and Upgrading Technology Conference in Edmonto, Alberta Canada on Jun. 6–7, 1985 Entitled "A Block Value Modelling Application In Tar Sands".

Hugh H. Jacks, et al (EPR Co.) The Modelling of a Three–Dimensional Reservoir With a Two–Dimensional Reservoir Simulator–The Use of Dynamic Pseudo Functions, Jun. 1973, Society of Petroleum Engineers Journal, pp. 175 to 185.

"Stratigraphic Relationships & Geologic History Depicted by Computer Mapping: The American Association of Petroleum Geology Bulletin", V. 67, No. 9, Sep. 1983, pp. 1415–1421, Jones and Johnson (Exxon Prod. Res. Co.).

A. Fredrick Banfield, et al., Book, "Evaluation of Multiple Seam Coal Deposits–A Generalized Case Study", pp. 371–385, Computer Methods for the 80's in the Mineral Industry, 1979, Society of Mining Engineers of the American Institute of Mining Metalurgical, and Petroleum Engineers (N.Y., N.Y.).

Henry B. Crichlow–Modern Reservoir Engineering–A Simulation Approach, 1977, Prentice–Hall, Inc., N.J. pp. 237–247.

Publication Referenced in U.S. Pat. No. 4,821,164: Address by Thomas A Jones, "Three Dimensional Computer Modelling For Exploration and Reservoir Analysis" Annual Convention, AAPG (Mar. 24–27, 1985).

Grender, et al., "Experiment in Quantitve Geologic Modelling" AAPG Bulletin, V. 58, No. 3 (Mar. 1974), pp. 488–498.

Harris, D. G., "The Role of Geology in Reservoir Simulation Studies" Journal of Petroleum Technology, May 1975, pp. 625–632.

Hiraski, G. J., et al, "Representation of Reservoir Geometry For Numerical Simulation", SPE Journal, Dec. 1970, pp. 393–404.

Wadsley, W. A., "Modelling Reservoir Geometry With Non–Rectangular Coordinate Grids", Paper of 55th Annual Fall Technical Conference and Exhibition of the Society of Petroleum Engineers of AIME, Dallas, Texas, Sep. 21–14, 1980.

Coats, K. H., "Reservoir Simulation: State of the Art", Society of Petroleum Engineers of AIME, Aug. 1982, pp. 1633–1642.

Watts, J. W., et al, "The Simulation of Petroleum Reservoirs", Perspectives in Computing, IBM Applications in the Academic and Scientific Community, vol. 5, No. 1, Spring 1985.

*Primary Examiner*—Donald McElheny, Jr.

[57] ABSTRACT

A process for modeling a bounded volume having a given geologic stratigraphic pattern, other than a volume having layers of uniform thickness parallel to mean sea level. The process comprises the steps of constructing a separate grid for each critical surface bounding said volume and constructing layers of cells according to the stratigraphic pattern.

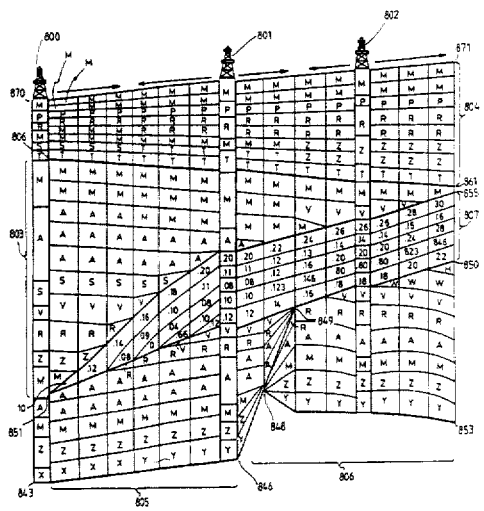

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 12 is confirmed.

Claim 11 is cancelled.

Claims 1, 2, 6, 10, 13 and 14 are determined to be patentable as amended.

Claims 3, 4, 5, 7, 8, 9, 15 and 16 dependent on an amended claim are determined to be patentable.

1. A process for modeling a geologic volume bounded by *at least lower, intermediate and upper* critical surfaces, the volume having a given geologic stratigraphic pattern *of at least two depositional sequences each of which defines a volume*, other than a volume having depositional layers parallel to mean sea level, the process comprising the steps of:
   a. constructing a separate grid for each critical surface bounding said volume; [and] *such that a lower depositional sequence is bound by said lower and intermediate critical surfaces and an upper depositional sequence is bound by said intermediate and upper critical surfaces;*
   b. *identifying said lower and intermediate critical surfaces respectively as being either an initiating critical surface or a terminating critical surface according to the stratigraphic pattern of said lower depositional sequence;*
   c. *identifying said intermediate and upper critical surfaces respectively as being either an initiating critical surface or a terminating critical surface according to the stratigraphic pattern of said upper depositional sequence; and*
   [b.] *d.* constructing layers of cells *within said lower depositional sequence and said upper depositional sequence* within said volume according to [said pattern.] *patterns defined by said lower and intermediate critical surfaces for said lower depositional sequence and by said intermediate and upper critical surfaces for said upper depositional sequence.*

2. A process for modeling a stratigraphic geologic subvolume including an inclined initiating surface, a limiting surface and layers of sediments spanning an interval of geological time occupying the space between said surfaces, which comprises:
   *first creating a cell structure model by* dividing said space into a plurality of laterally disposed, laterally aligned and vertically spaced grids of elemental cells, each cell having a reference point at each of its corners, the reference points in each said grid positioned to be along a grid layer of sediments of the same geologic time and to be equally spaced horizontally from each laterally adjacent reference point in said grid;
   vertically spacing said grids such that each said reference point in a vertical column of reference points is equidistant from each next adjacent points is equidistant from each next adjacent reference point in said column;
   assigning representative x, y, z coordinates to each said reference point such that each elemental cell in said space may be identified by the sets of said coordinates at its respective corners; and
   reproducibly recording said sets of coordinates in digital form[.] *and then assigning a model attribute value of any cell in a layer based upon the relative position of such cell in its layer to one or more actual attribute values located within said layer.*

6. A process for modeling a geologic subvolume including an inclined originating surface, a limiting surface, and layers of sediments spanning an interval of geologic time occupying the space between said surfaces, which comprises:
   (1) dividing said space into a plurality of cells by
       (a) constructing a grid for said originating surface;
       (b) constructing layers of laterally disposed cells from said grid, the cells in successive said layers aligned in vertical columns[;] , *said layers having predetermined constant vertical thickness as between critical surfaces at any x-y position,*
   (2) assigning a set of coordinates to each said cell, whereby each said cell may be identified by its respective coordinates;
   (3) reproducibly and systematically recording said sets of coordinates; and
   (4) reproducibly recording a characteristic of a given cell in association with the coordinates of said given cell[.] *by assigning a model attribute to such given cell based upon the relative position of such cell in its layer to one or more acutal attributes located within said layer.*

10. A process for modeling a bounded geologic volume, other than a volume having depositional layers parallel to mean sea level, having a given geologic stratigraphic pattern and a given initiating critical surface, comprising the steps of:
    (a) constructing a separate grid for each critical surface bounding said volume; and
    (b) constructing layers of cells between said grids and substantially parallel to said given initiating critical surface[.] *,wherein said initiating critical surface is a naive surface.*

13. A method using a stored program processor to model a geologic volume bounded by an initiating critical surface and a limiting critical surface with inclined depositional layers interposed between the two critical surfaces in a given stratigraphic pattern, comprising:
    a. constructing an initiating grid to represent the initiating surface;
    b. constructing a limiting grid to represent the limiting surface; and
    c. constructing layers of *equal thickness* cells between the initiating grid and the limiting grid in accordance with the given stratigraphic pattern with the cells arranged in vertical columns from layer to layer.

14. A method using a stored program processor of modeling a geologic volume having depositional layers in a given stratigraphic pattern which includes layers other than horizontal which are bounded by an initiating *critical* surface and a limiting *critical* surface, comprising the steps of:
    a. constructing a first grid representative of the initiating *critical* surface and a second grid representative of the limiting *critial* surface[;] *or a pair of bounding critical surfaces;* b. constructing spaced grids intermediate the first and second grids representative of depositional layering in accord with the given stratigraphic pattern[;] *wherein each layer;*

(*1*) *conforms in shape of said initiating critical surface and terminates against said limiting critical surface with cells of equal vertical thickness between such surfaces, or*

(*2*) *conforms in shape proportionately to the space between said pair of bounding critical surfaces,* c. filling the space between the grids with cells arranged in vertical columns with adjacent cells in each column separated by one of said grids; and d. assigning coordinates to each said cell.

* * * * *